(12) United States Patent
Kinstler

(10) Patent No.: US 7,484,691 B2
(45) Date of Patent: Feb. 3, 2009

(54) METHOD AND DEVICE FOR MAGNETIC SPACE RADIATION SHIELD PROVIDING ISOTROPIC PROTECTION

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 11/171,967

(22) Filed: Jun. 30, 2005

(65) Prior Publication Data

US 2006/0169931 A1     Aug. 3, 2006

Related U.S. Application Data

(63) Continuation-in-part of application No. 11/046,401, filed on Jan. 28, 2005.

(51) Int. Cl.
*B64G 1/52* (2006.01)
*H05K 9/00* (2006.01)
*H01F 6/00* (2006.01)

(52) U.S. Cl. ............... 244/171.7; 335/216; 335/301; 174/353; 174/391

(58) Field of Classification Search ............ 174/353, 174/391, 396; 335/216, 301; 244/171.7, 244/171.8
See application file for complete search history.

(56) References Cited

U.S. PATENT DOCUMENTS

| 3,130,413 | A |   | 4/1964  | Schueller      |          |
|-----------|---|---|---------|----------------|----------|
| 3,224,375 | A | * | 12/1965 | Hoff           | 244/159.1|
| 3,378,691 | A | * | 4/1968  | Swartz         | 307/91   |
| 3,801,942 | A |   | 4/1974  | Elsel          |          |
| 5,012,217 | A |   | 4/1991  | Palkovich et al. |        |
| 6,977,571 | B1|   | 12/2005 | Hollis et al.  |          |

OTHER PUBLICATIONS

Nancy Atkinson; *Riding in Magnetic Bubbles*; Astrobiology Magazine: Search for Life in the Universe; http://www.astrobio.net/news/article1342.html (visited Jan. 28, 2005).

Richard Reifsnyder; *Radiation Hazards on a Mars Mission*; The Martian Chronicles; Issue 8, Winter 2001; The Mars Society Youth Chapter; http://chapters.marssociety.org/youth/mc/issue8/radiation.php3 (visited Jan. 28, 2005).

(Continued)

*Primary Examiner*—Ramon M Barrera
(74) *Attorney, Agent, or Firm*—Alston & Bird LLP

(57) ABSTRACT

There is provided a radiation shield device for providing radiation protection to an area, such as a manned vehicle. The radiation shield device comprises a magnetic field generator, such as a solenoid, of superconductive material that provides a magnetic field around the area to shield the area from radiation. The magnetic field generator preferably comprises at least one trapezoidal portion to provide substantially isotropic protection to the area. A thermal control system, comprising a limited amount of coolant or a refrigeration cycle, is included to control a temperature of the superconductive material during operation of the magnetic field generator. A magnetic shield device may also be provided between the magnetic field generator and the area to be shielded from radiation to substantially shield the area from the magnetic field generated by the magnetic field generator.

30 Claims, 15 Drawing Sheets

OTHER PUBLICATIONS

*Study of Magnetospheric Propulsion (eMPii)*; Space Environment and Effects Section; Contracts Final Presentation Feb. 19-20, 2004.

Jeffrey A. Hoffman, Peter Fisher and Oleg Batishchev; *Use of Superconducting Magnet Technology for Astronaut Radiation Protection*; Final Report for NIAC Phase I Contract CP 04-01; May 2, 2005; pp. 1-38; Massachusetts Institute of Technology, Cambridge, Massachusetts.

S.H. Levine, R. Lepper, *An Active Radiation Shield For Cylindrically Shaped Vechicles, Journal Of Spacecraft*, vol. 8, No. 7, Jul. 1971, pp. 773-777.

L.W. Townsend, *HZE Particle Shielding Using Confined Magnetic Fields (High-Energy Heavy Ions), Journal Of Spacecraft And Rockets, American Institute of Aeronatutics and Astronautics*, Reaston, Virginia, vol. 20, Nov. 1983, pp. 629-630.

P. Spillantini, *Radiation Shielding Of Spacecraft In Manned Interplanetary Flights, Nuclear Physics (Proceedings Supplements)*, Elsevier, Amsterdam, vol. 85, 2000, pp. 3-11.

L.W. Townsend, *Critical Analysis Of Active Shielding Methods For Space Radiation Protection, Conference Paper, 2005 IEEE Aerospace Conference*, Mar. 5-12, 2005, Piscataway, New Jersey.

European Search Report, EP 06253162.9-2422, dated Nov. 24, 2006.

\* cited by examiner

METHOD AND DEVICE FOR MAGNETIC SPACE RADIATION SHIELD PROVIDING ISOTROPIC PROTECTION

CROSS-REFERENCES TO RELATED APPLICATIONS

This application is a continuation-in-part of copending U.S. patent application Ser. No. 11/046,401, filed on Jan. 28, 2005, which is hereby incorporated herein in its entirety by reference.

BACKGROUND OF THE INVENTION

1. Field of the Invention

The present invention is related to radiation shielding, and more particularly, to a magnetic field generator of superconductive material for radiation protection.

2. Description of Related Art

The sun occasionally releases significant amounts of charged particles during events known as coronal mass ejectas ("CMEs"). The charged particles released during CMEs include electrons, protons, and heavy ions. Such proton and heavy ion radiation can cause severe cell damage when humans are exposed to such radiation. Additionally, sensitive electronic components and other devices may be adversely affected by such radiation. Therefore, even though CMEs are relatively uncommon occurrences, the amounts of radiation they could potentially inflict upon a crew and equipment of a spacecraft gives rise for a need to shield part or all of such spacecraft from such radiation. Similarly, a need exists for radiation protection in other environments as well, such as habitats for celestial bodies such as the moon and Mars.

Studies of the time history build-up and decay of CME charged particle flux densities conducted in recent years have lead to the conclusion that CME fluxes are essentially isotropic in nature by the time they reach the vicinity of the earth. These fluxes are thrown out from the sun, immersed in a kind of magnetic field, which acts to bottle up the CME flux, with the energetic particles deflecting off the magnetic structure of the CME plasma, with a mean free path of about 0.04 astronomical unit. Thus, an energetic particle within the CME typically undergoes well over 25 magnetic deflections enroute to the earth, effectively scrambling the directionality of the flux, leading to the requirement that for a shield to be effective, it must provide isotropic protection.

Shielding from proton and heavy ion radiation may generally be accomplished by either absorbing the particles or by deflecting the particles. To absorb the radiation, materials of a thickness sufficient for the amount of energy expected from the radiation, can be provided around an area that houses the crew and/or sensitive equipment during a CME. However, because of the significant amount of weight such a housing would require, the use of radiation absorbing material is not practical for space exploration and other applications. Additionally, the absorption of high energy particles releases a different form of radiation such as gamma rays, neutrons, and X-rays that pass through the shielding material and may harm the crew and/or equipment.

Therefore, it is generally preferred to deflect the particles of radiation rather than absorb them. One example of effective deflection of CME radiation is the earth's magnetosphere which creates a magnetic field of enough flux density to change the trajectory of such radiation particles from the sun or elsewhere, thus causing the radiation to be diverted away from the earth. Therefore, it would be desirable to create an artificial magnetosphere around an area, such as a spacecraft crew compartment, that required shielding from such radiation. However, because of the need to minimize the weight and energy consumption of spacecrafts, systems for creating such an artificial magnetosphere, for even a relatively brief period of time, such as a day or two, have not been practical based upon the amount of material and/or energy required.

A need therefore exists for a radiation shield that is relatively lightweight and that requires relatively little energy.

BRIEF SUMMARY OF THE INVENTION

The invention addresses the above needs and achieves other advantages by providing a radiation shield device for protecting an area from radiation. The radiation shield device includes a magnetic field generator of superconductive material that provides a magnetic field around the area to shield the area from radiation. In some embodiments of the invention, the magnetic field generator is a solenoid comprising a coil of Niobium-Titanium (NbTi) embedded in a copper wire. The magnetic field generated preferably has a magnetic flux density between 0.5 to 10 Tesla. To cool the superconductive material to a desired temperature, the radiation shield device also comprises a thermal control system, which in some embodiments of the invention may be either an open loop system including a coolant of liquid helium or liquid neon or a closed loop refrigeration cycle.

The radiation shield device may also include a magnetic shield device for substantially shielding the area from the magnetic field generated by the magnetic field generator. Preferably, the magnetic shield device comprises a layer of high magnetic permeability/saturation material disposed between the magnetic field generator and the area to be shielded from radiation. Therefore, the radiation shield device of one embodiment of the present invention shields an area from radiation from CMEs and other sources, while also providing protection from the magnetic field that provides a shield to the radiation.

Further embodiments of the present invention include a radiation shield device having a solenoid of superconductive material for providing a magnetic field around the area to shield the area from radiation, wherein the solenoid defines an axial length that is substantially smaller than a diameter of the solenoid. The solenoid of superconductive material preferably provides a magnetic field having a magnetic flux density of 0.5 to 10 Tesla. The superconductive material of the solenoid may be a coil of Niobium-Titanium (NbTi) embedded in a copper wire that comprises at least 1,000,000 Ampere-turns. The radiation shield device also includes a thermal control system for controlling a temperature of the superconductive material.

The present invention also provides methods for manufacturing a radiation shield device. One or more solenoids of superconductive material are installed around the area to be shielded from radiation, such that the solenoids define axial lengths that are substantially smaller than, or less than 25% of, the diameter. A thermal control system, such as an open loop or closed loop system, is provided in thermal communication with the superconductive material to enable the temperature of the superconductive material to be maintained within a predetermined temperature range during subsequent operation of the radiation shield device. The method of manufacturing may also include positioning a magnetic shield device between the solenoid of superconductive material and the area to be shielded from radiation. The present invention thus provides protection from radiation exposure to people and/or equipment within a spacecraft or other structures. The radiation shield device preferably has a minimal weight while requiring minimal energy to operate, thus making it feasible to utilize in applications where weight and energy consumption are critical parameters.

BRIEF DESCRIPTION OF THE SEVERAL VIEWS OF THE DRAWINGS

Figure 1:
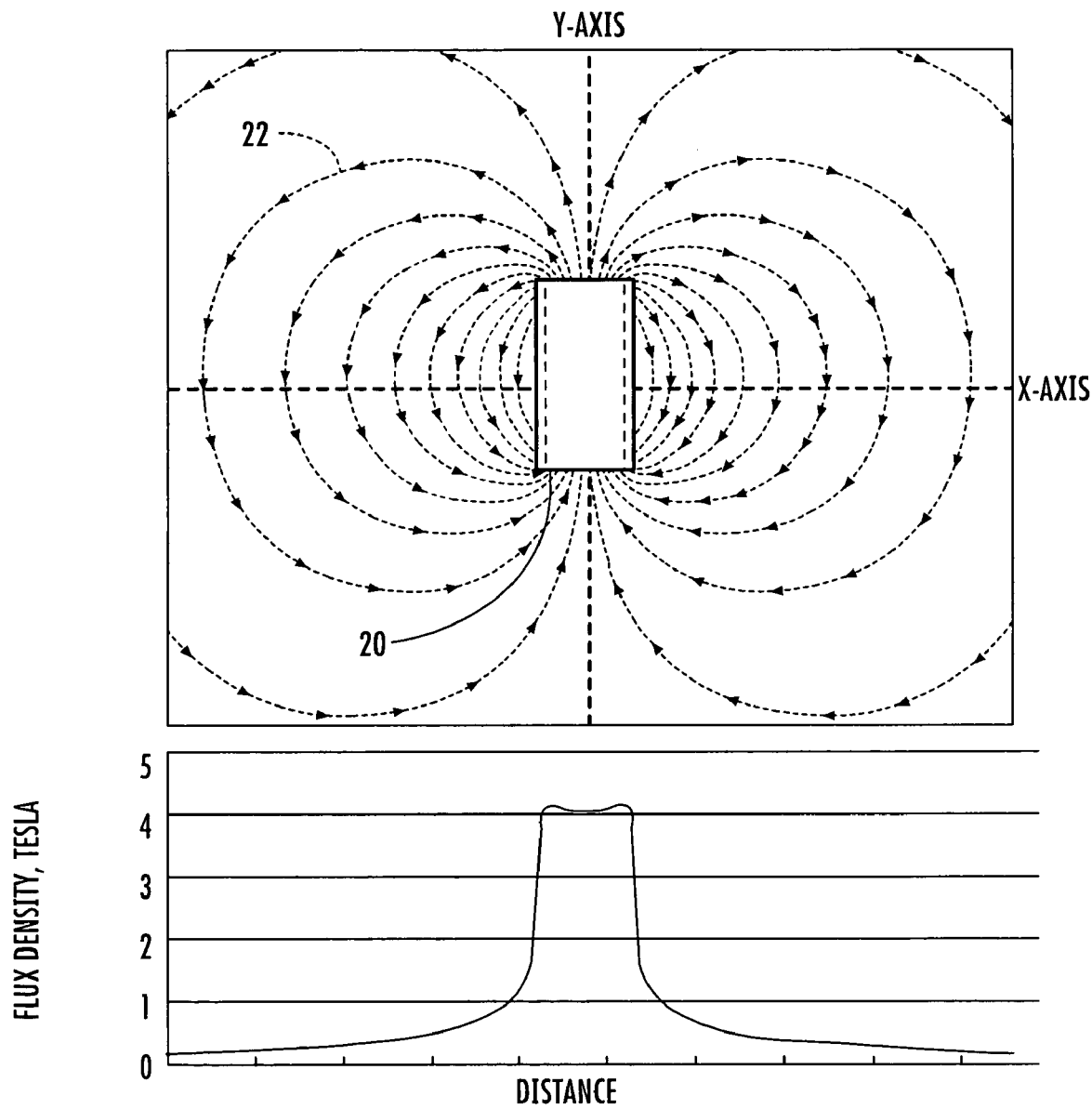
Figure 2:
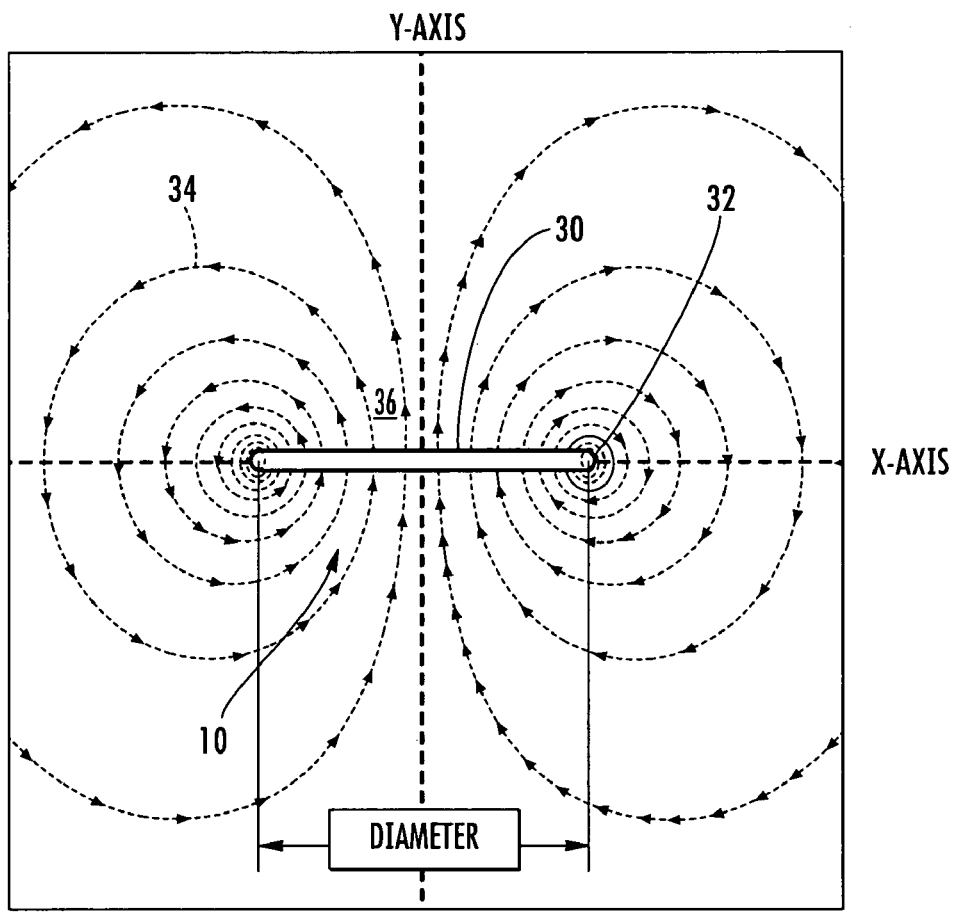
Figure 2:
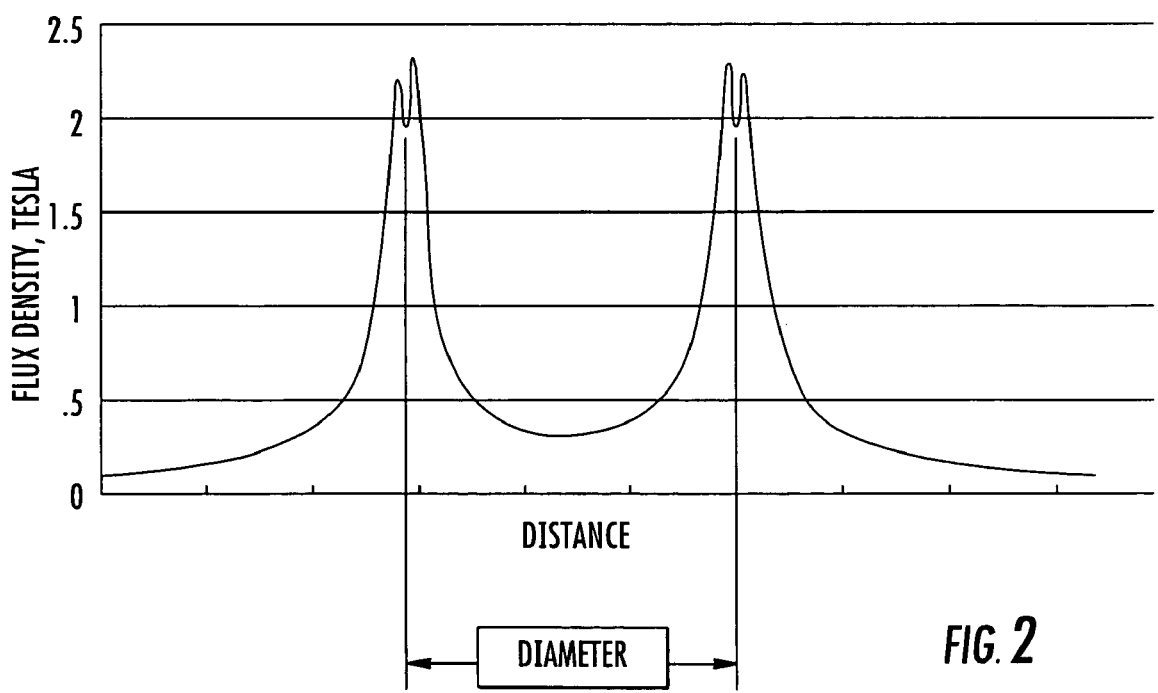
Figure 3:
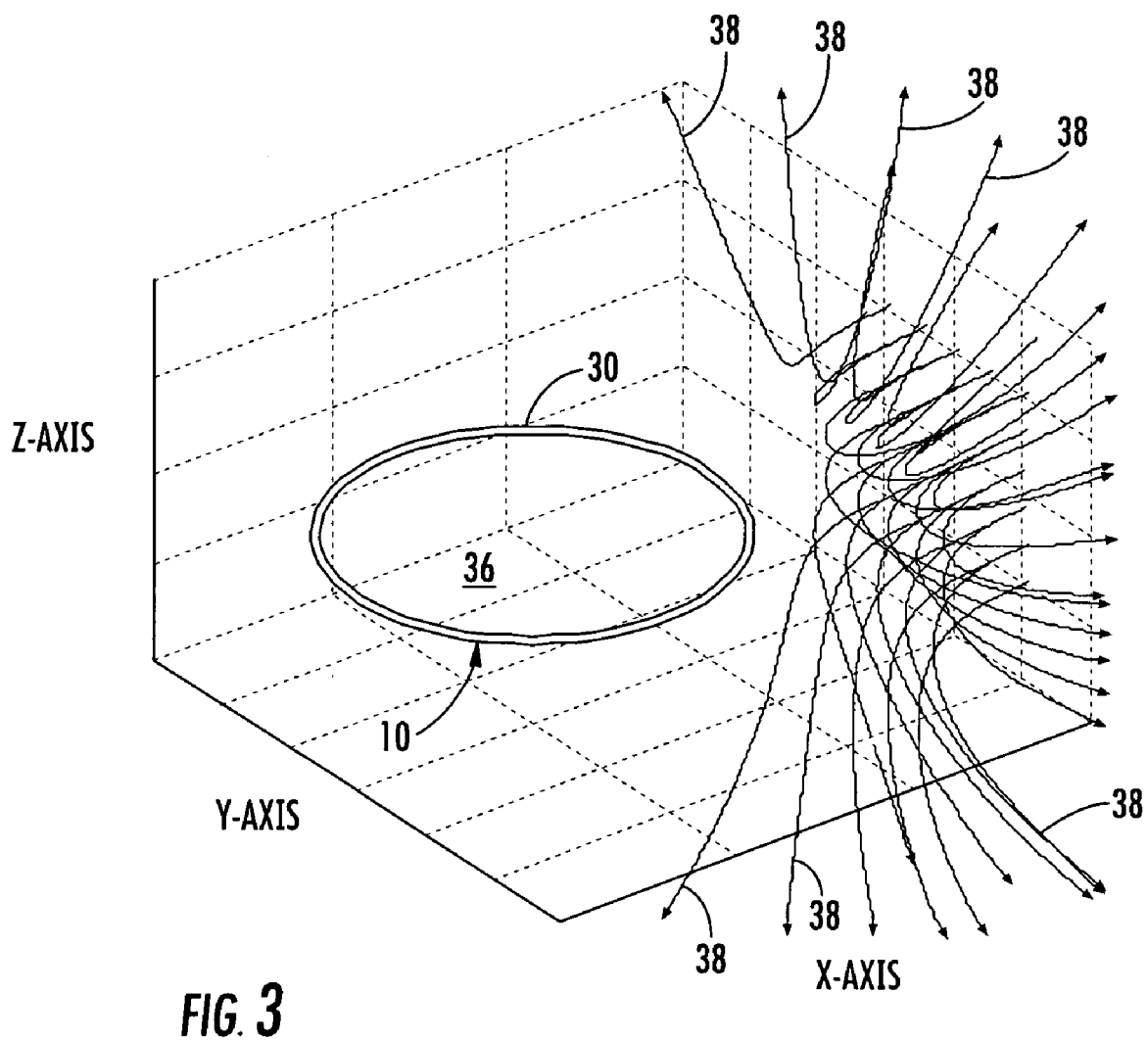
Figure 4:
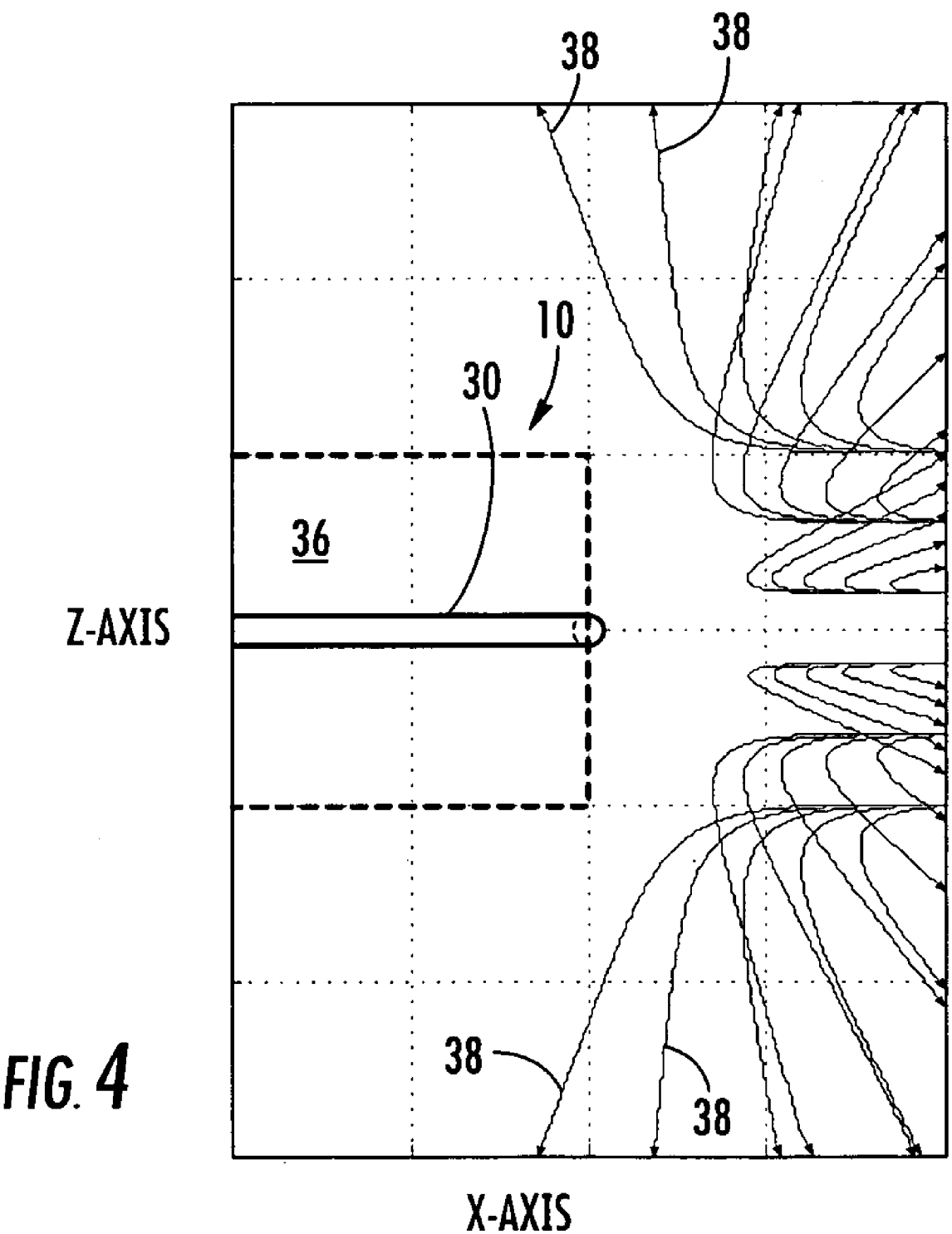
Figure 5:
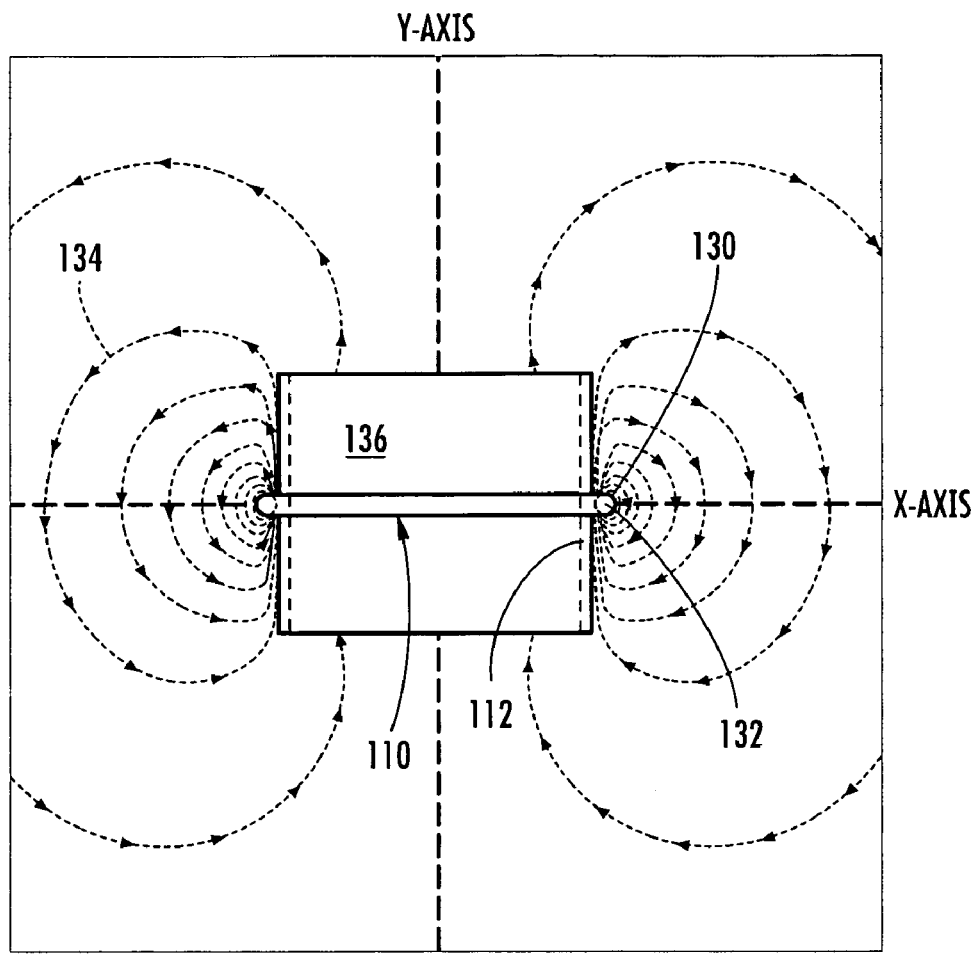
Figure 5:
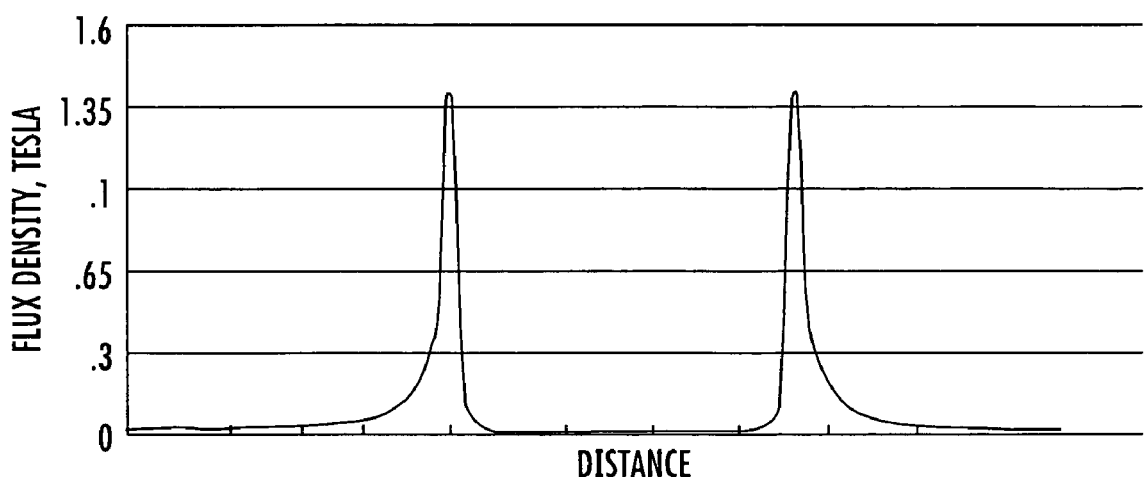
Figure 6:
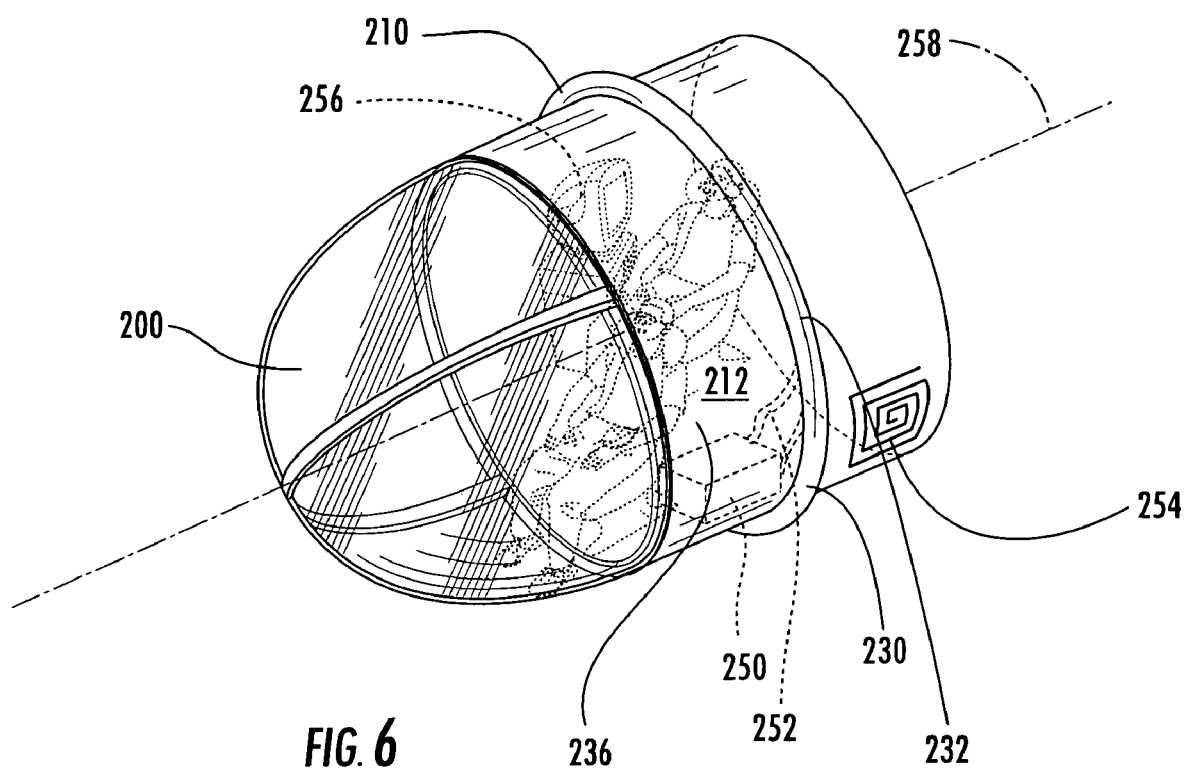
Figure 7:
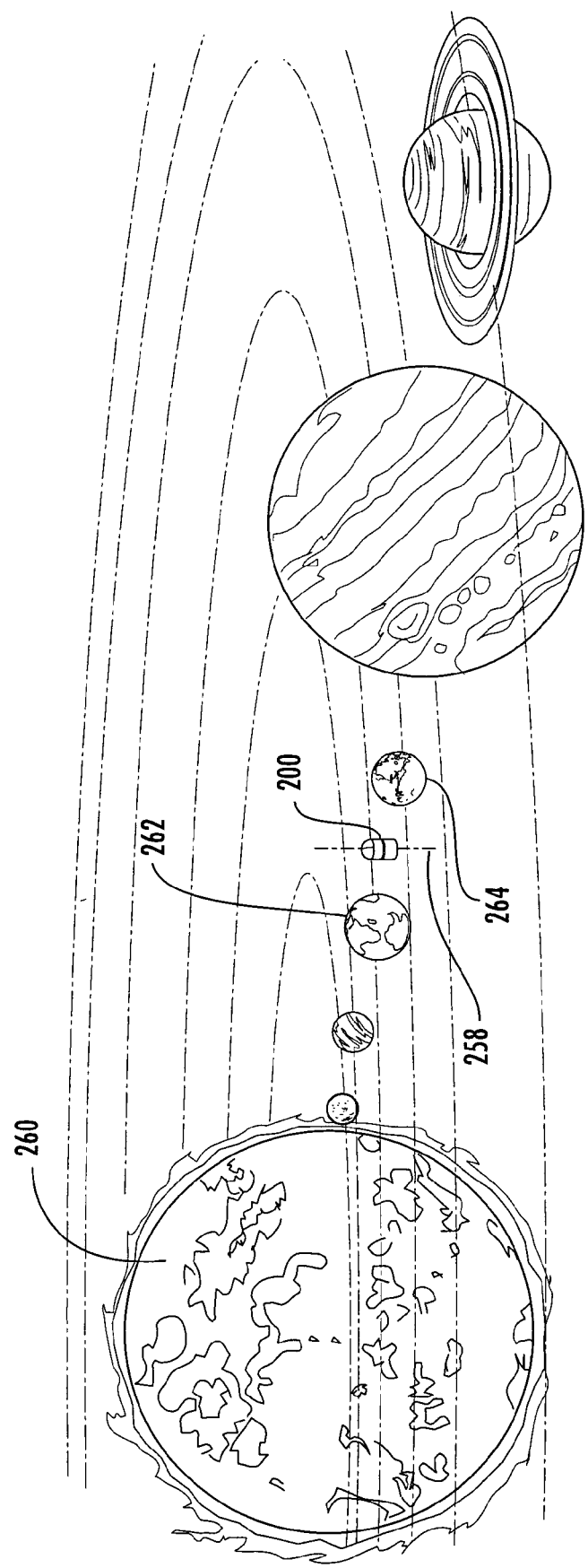
Figure 8:
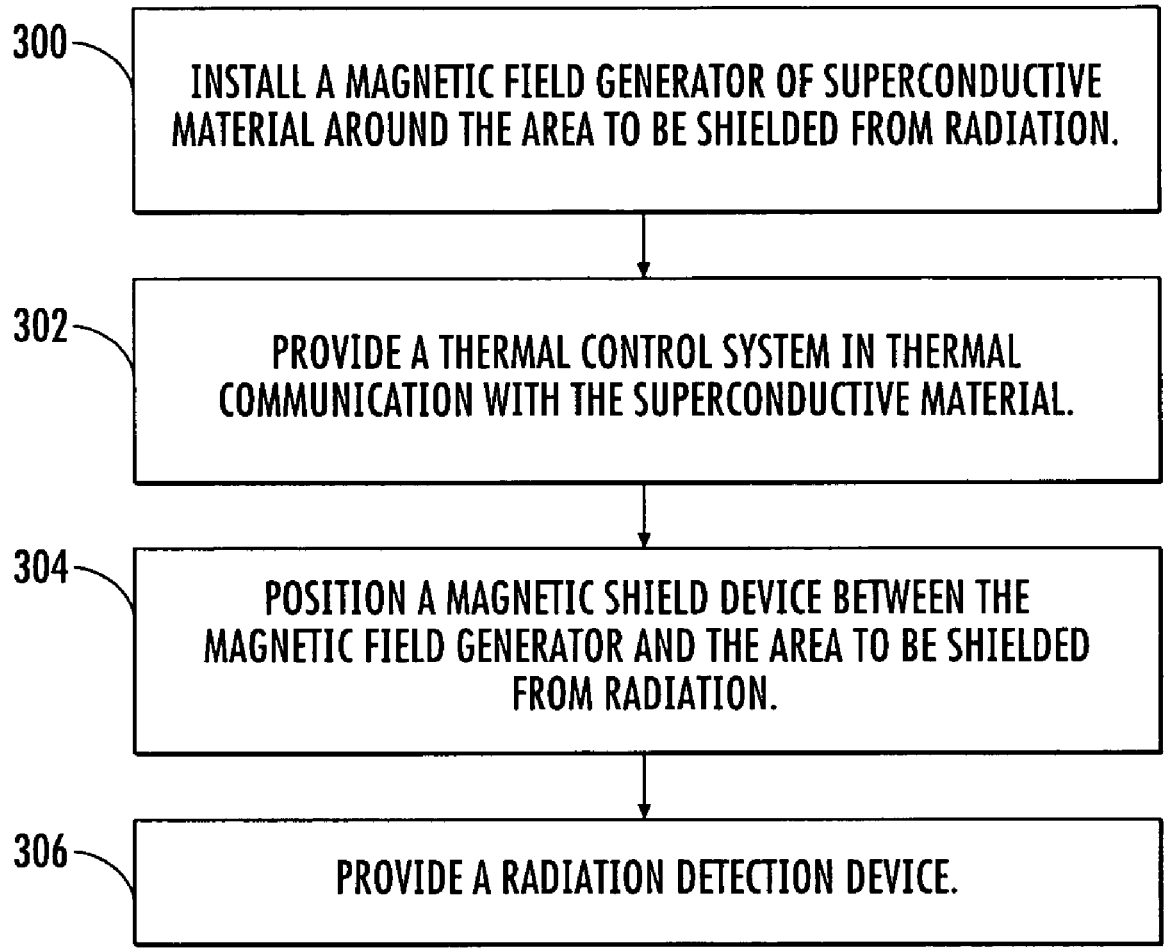
Figure 9:
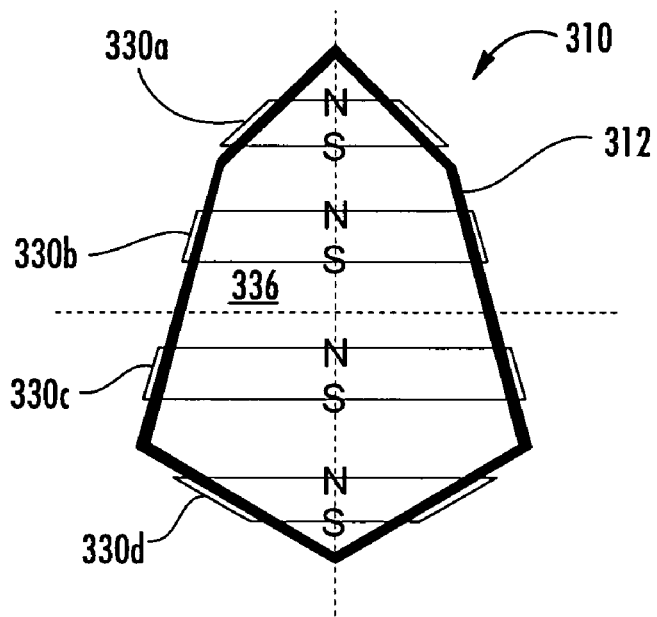
Figure 10:
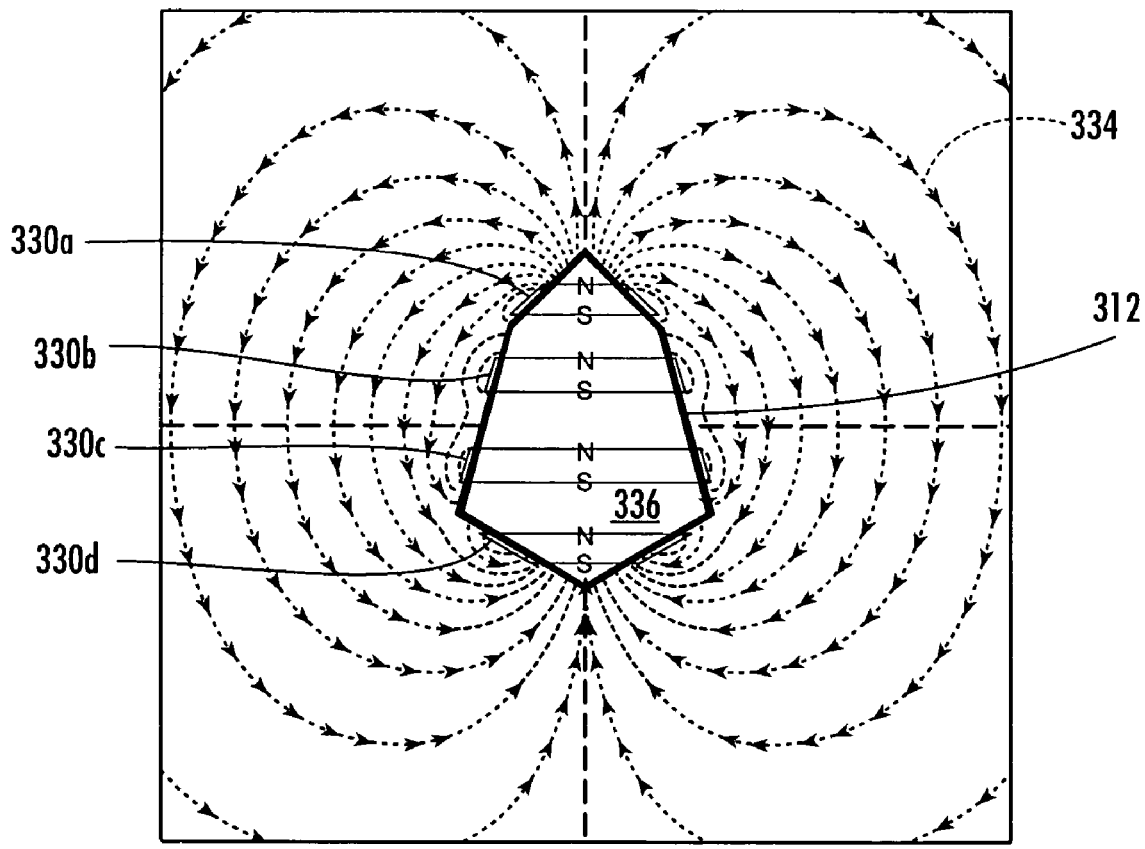
Figure 11:
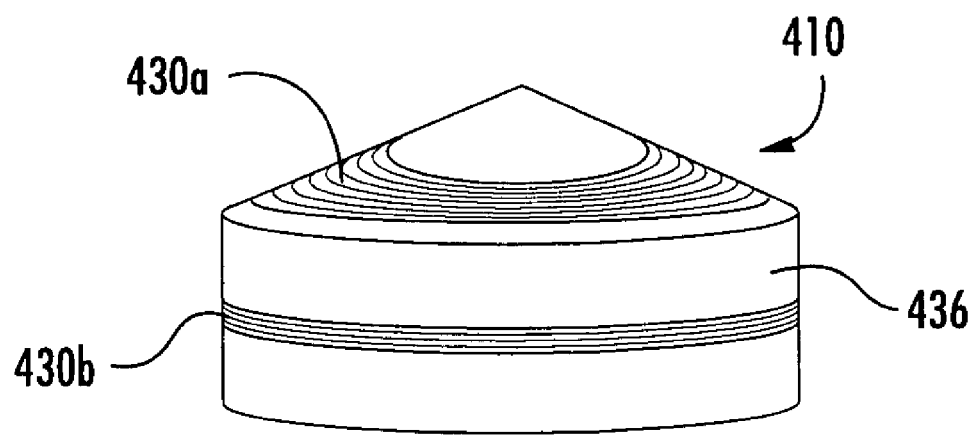
Figure 12:
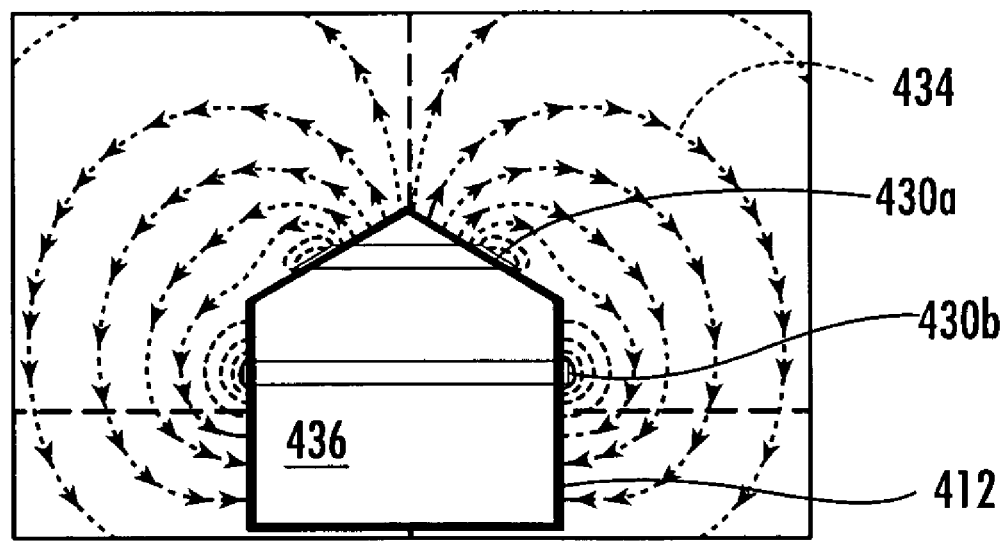
Figure 13:
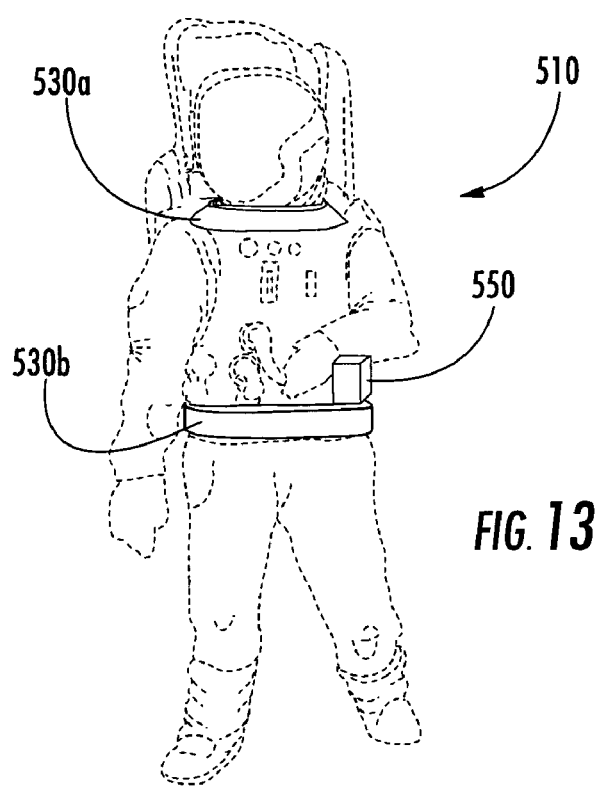
Figure 14:
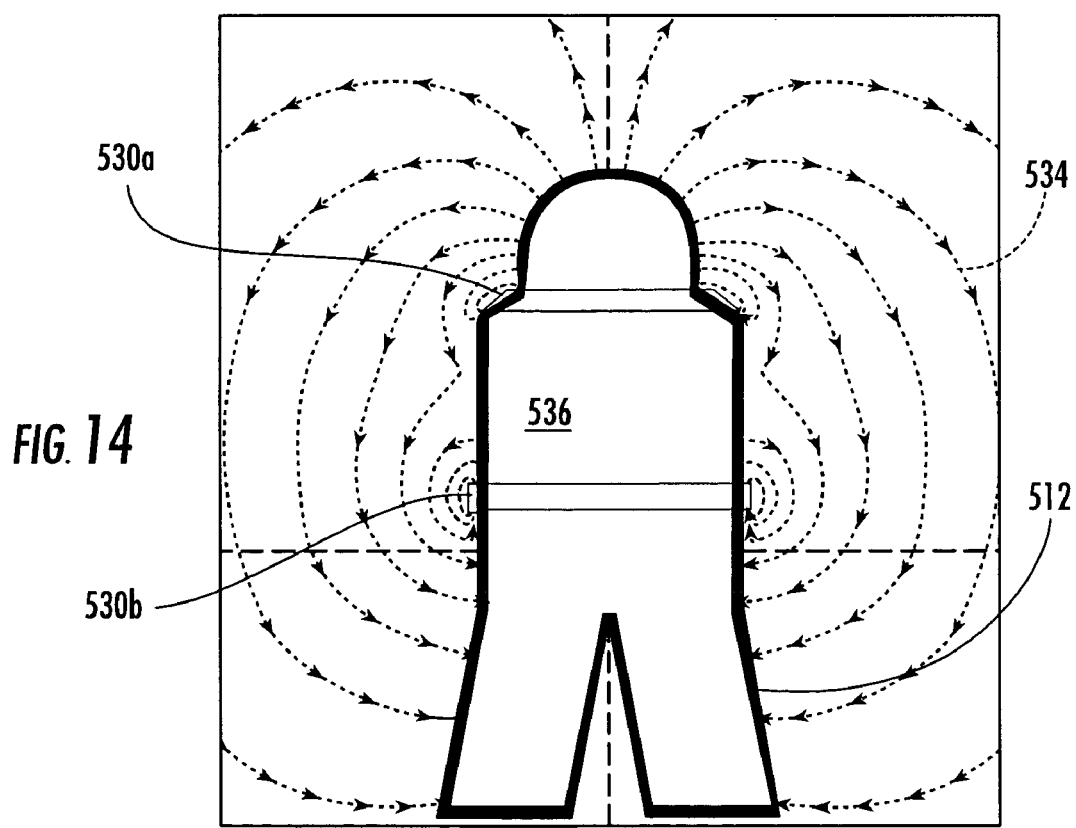
Figure 15:
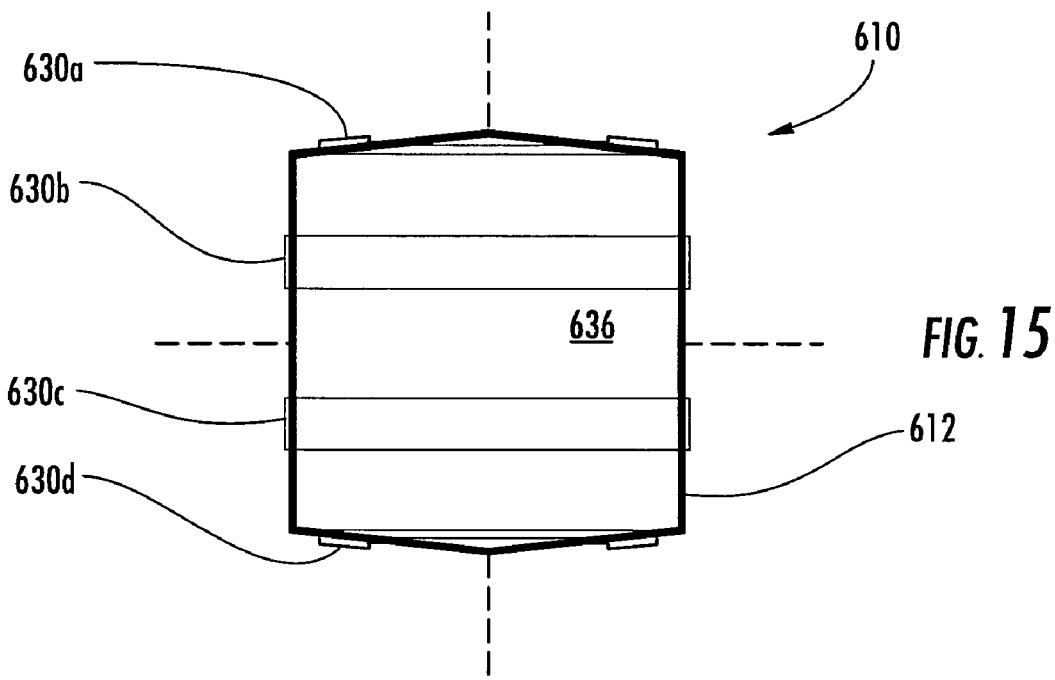
Figure 16:
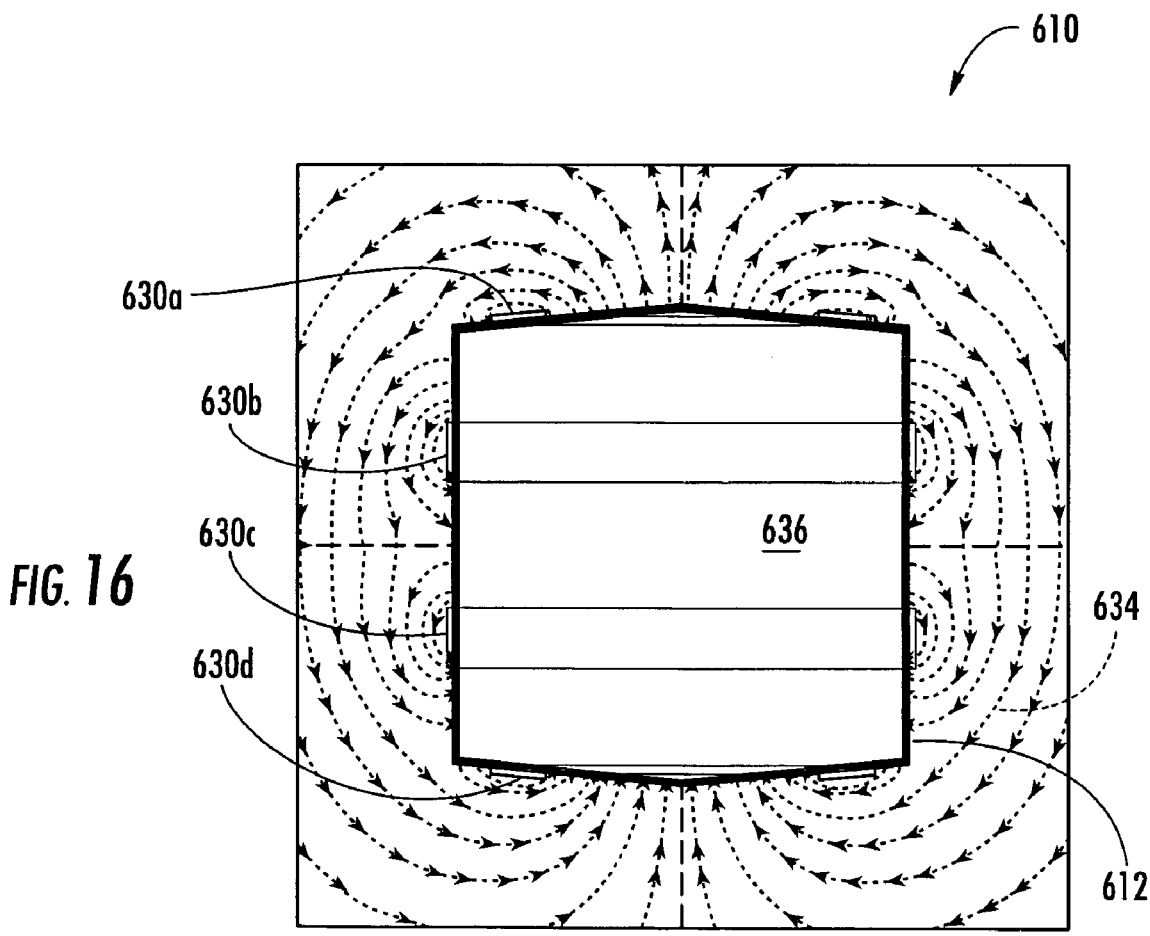
Figure 17:
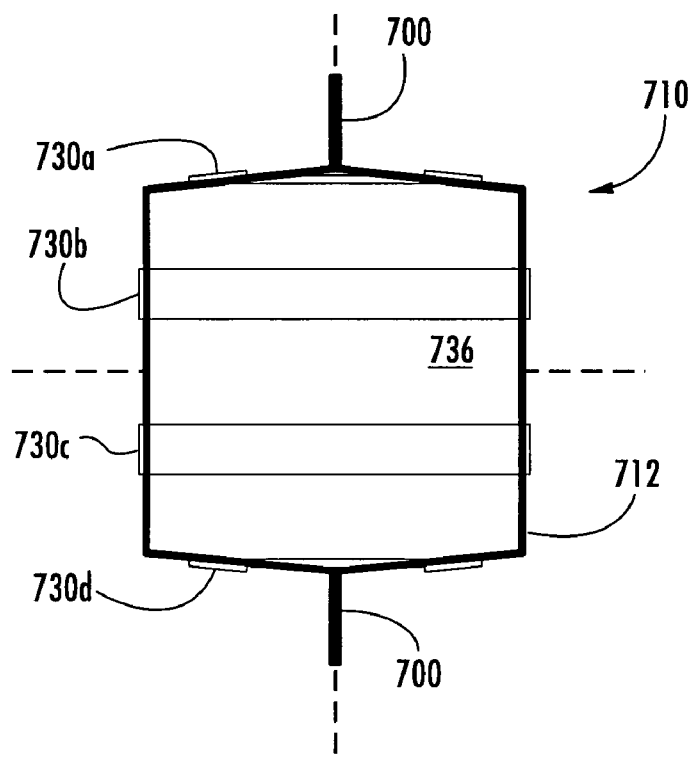
Figure 18:
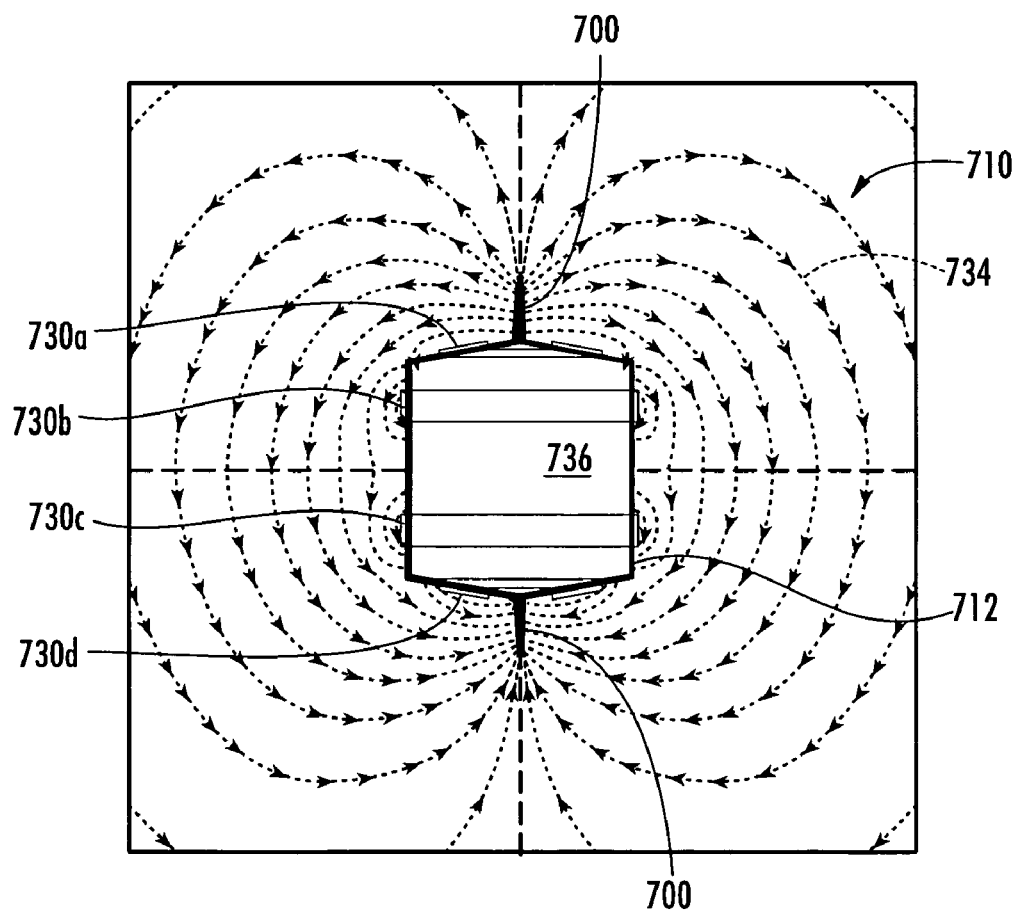
Figure 19:
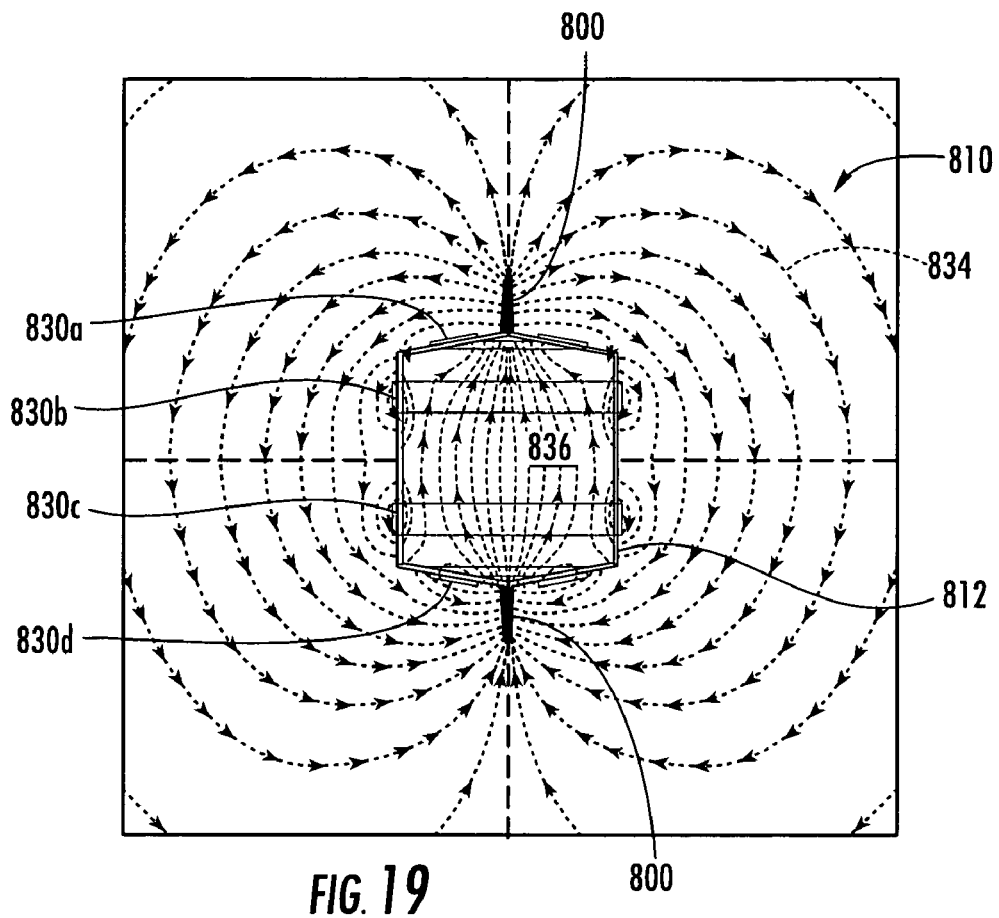
Figure 20A:
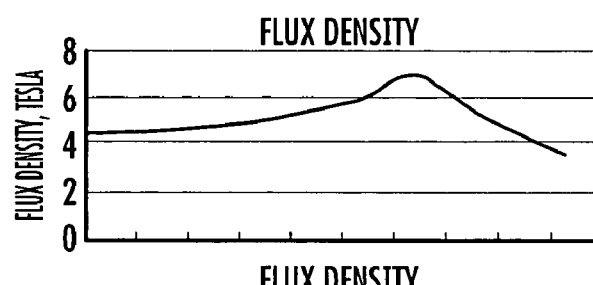
Figure 20B:
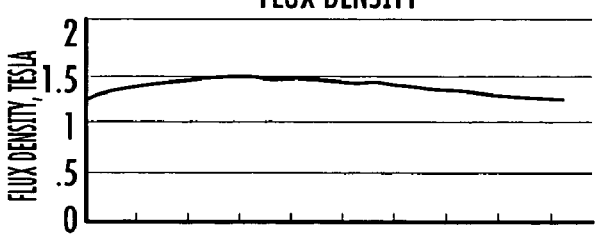
Figure 20C:
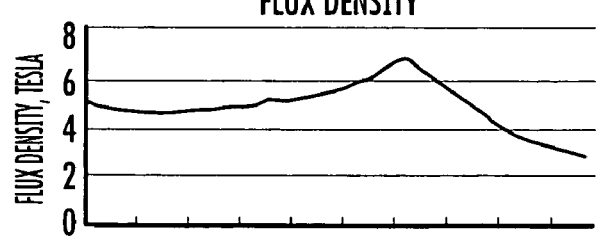
Figure 21A:
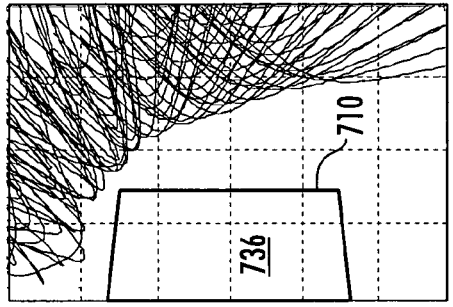
Figure 21E:
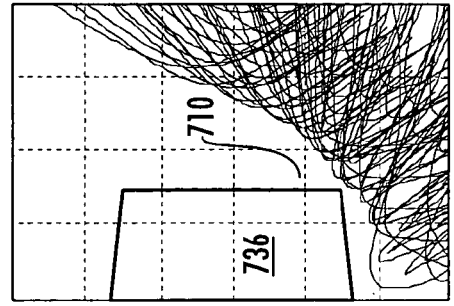
Figure 21B:
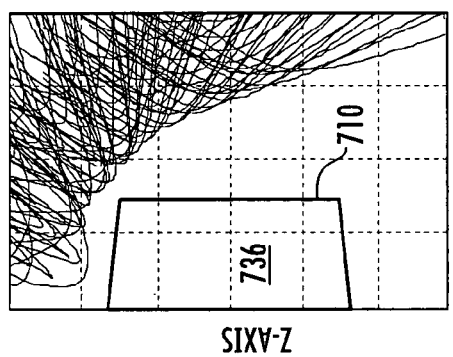
Figure 21F:
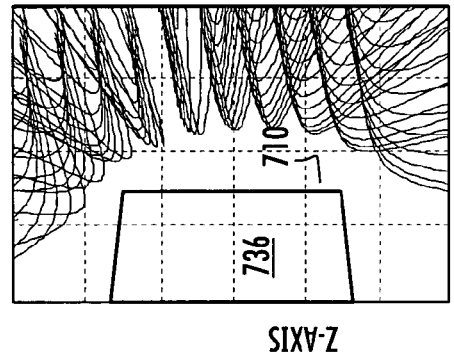
Figure 21C:
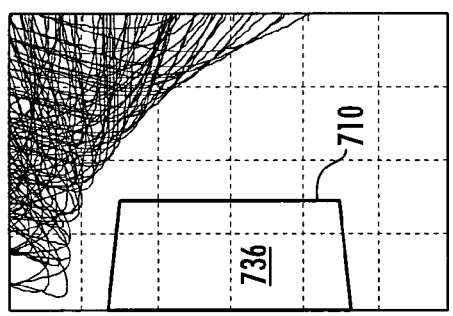
Figure 21G:
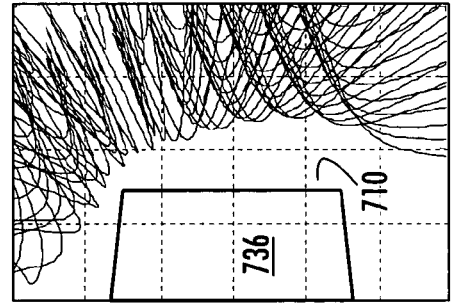
Figure 21D:
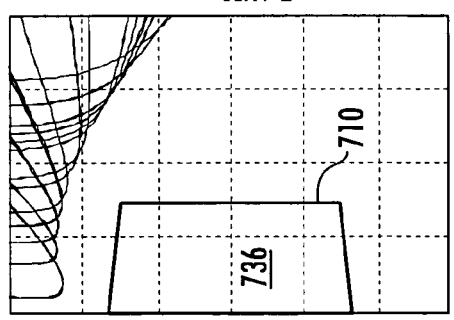
Figure 21H:
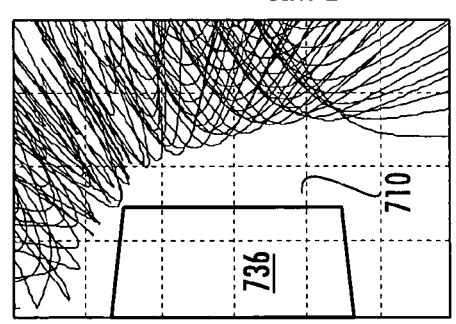

Having thus described the invention in general terms, reference will now be made to the accompanying drawings, which are not necessarily drawn to scale, and wherein:

FIG. 1 is a side cross-sectional view of a prior art solenoid, illustrating the magnetic flux lines and representing the magnetic flux density of the magnetic field as a function of distance across the solenoid;

FIG. 2 is a side cross-sectional view of a magnetic field generator of one embodiment of the present invention, illustrating the magnetic flux lines and representing the magnetic flux density of the magnetic field as a function of distance across the magnetic field generator;

FIG. 3 is a perspective representation of the magnetic field generator of FIG. 2, illustrating the paths of multiple particles of radiation that are deflected away from the left side of the magnetic field generator;

FIG. 4 is a side elevational view of FIG. 3, further illustrating the paths of deflected particles of radiation and showing an area that is shielded from radiation;

FIG. 5 is a side cross-sectional view of a magnetic field generator of a second embodiment of the present invention having a magnetic shield device, illustrating the magnetic flux lines and representing the magnetic flux density of the magnetic field as a function of distance across the magnetic field generator;

FIG. 6 is a perspective view of a radiation shield device of a third embodiment of the present invention, illustrating the position of the magnetic field generator and magnetic shield device relative to the area on a spacecraft that is substantially shielded from radiation;

FIG. 7 is a perspective, environmental view of the spacecraft of FIG. 6;

FIG. 8 is a flowchart of steps for manufacturing a radiation shield device according to one embodiment of the present invention;

FIG. 9 is a side cross-sectional view of a radiation shield device of a fourth embodiment of the present invention, illustrating the multiple magnetic field generators at various axial positions of the spacecraft;

FIG. 10 is a side cross-sectional view of the radiation shield device of FIG. 9, illustrating the magnetic flux lines generated by the magnetic field generator to provide isotropic protection from particles of radiation;

FIG. 11 is a perspective, environmental view of a radiation shield device of a fifth embodiment of the present invention, illustrating the multiple magnetic field generators at two axial positions of a ground habitat;

FIG. 12 is a side cross-sectional view of the radiation shield device of FIG. 11, illustrating the magnetic flux lines generated by the magnetic field generators to provide isotropic protection from particles of radiation;

FIG. 13 is a perspective, environmental view of a radiation shield device of a sixth embodiment of the present invention, illustrating the multiple magnetic field generators at two axial positions of a personal protection suit;

FIG. 14 is a side cross-sectional view of the radiation shield device of FIG. 13, illustrating the magnetic flux lines generated by the magnetic field generators to provide isotropic protection from particles of radiation;

FIG. 15 is a side cross-sectional view of a radiation shield device of a seventh embodiment of the present invention, illustrating magnetic field generators at four axial positions of a satellite;

FIG. 16 is a side cross-sectional view of the radiation shield device of FIG. 15, illustrating the magnetic flux lines generated by the magnetic field generators to provide isotropic protection from particles of radiation;

FIG. 17 is a side cross-sectional view of a radiation shield device of an eighth embodiment of the present invention, illustrating magnetic field generators at four axial positions of a spacecraft, a magnetic shield device, and a spike of high permeability/saturation metal;

FIG. 18 is a side cross-sectional view of the radiation shield device of FIG. 17, illustrating the magnetic flux lines generated by the magnetic field generators to provide isotropic protection from particles of radiation;

FIG. 19 is a side cross-sectional view of a radiation shield device of a ninth embodiment of the present invention having magnetic field generators at four axial positions of a spacecraft and a spike of high permeability/saturation metal with no magnetic shield device, illustrating the magnetic flux lines generated by the magnetic field generators to provide isotropic protection from particles of radiation;

FIG. 20A is a chart representing the magnetic flux density of the magnetic field of the radiation shield device of FIG. 18 as a function of axial distance from the base of the top spike away from the center of the satellite wherein the maximum flux density amount represents the axially distal end of the spike;

FIG. 20B is a chart representing the magnetic flux density of the magnetic field of the radiation shield device of FIG. 18 as a function of radial distance from the axial center of the sidewall of the satellite, wherein the plotted flux densities begin at a radial distance of 0.5 meter from the sidewall and extend radially an additional 1.0 meter;

FIG. 20C is a chart representing the magnetic flux density of the magnetic field of the radiation shield device of FIG. 18 as a function of axial distance from the base of the bottom spike away from the center of the satellite wherein the maximum flux density amount represents the axially distal end of the spike;

FIG. 21A is a graphic representation of ions approaching the radiation shield device of FIG. 18 at an angle of approach, relative to the axis of the magnetic field generator, of 0°;

FIG. 21B is a graphic representation of ions approaching the radiation shield device of FIG. 18 at an angle of approach, relative to the axis of the magnetic field generator, of 20°;

FIG. 21C is a graphic representation of ions approaching the radiation shield device of FIG. 18 at an angle of approach, relative to the axis of the magnetic field generator, of 40°;

FIG. 21D is a graphic representation of ions approaching the radiation shield device of FIG. 18 at an angle of approach, relative to the axis of the magnetic field generator, of 50°;

FIG. 21E is a graphic representation of ions approaching the radiation shield device of FIG. 18 at an angle of approach, relative to the axis of the magnetic field generator, of 60°;

FIG. 21F is a graphic representation of ions approaching the radiation shield device of FIG. 18 at an angle of approach, relative to the axis of the magnetic field generator, of 70°;

FIG. 21G is a graphic representation of ions approaching the radiation shield device of FIG. 18 at an angle of approach, relative to the axis of the magnetic field generator, of 80°; and FIG. 21H is a graphic representation of ions approaching the radiation shield device of FIG. 18 at an angle of approach, relative to the axis of the magnetic field generator, of 140°.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 2-6, a radiation shield device in accordance with one embodiment of the present invention is illustrated. The radiation shield device 10 of FIGS. 2-6 is described herein as providing protection from radiation for a manned space vehicle or a habitat for celestial bodies, particularly during CME events. However, further embodiments of the present invention comprise radiation shield devices for any situation where protection from particle radiation is desired both within and beyond the earth's atmosphere under any circumstance.

Reference will now be made to the prior art solenoid 20 of FIG. 1 illustrating a coil of conductive, or superconductive, material and representing the magnetic flux lines of the magnetic field 22 generated by the solenoid when an electrical current is passed through the solenoid, as known in the art. Solenoids typically define an axial length of material that is at least as long in an axial direction as the diameter is wide in a radial length. Furthermore, multiple solenoids may be provided to define a toroid that generates a single magnetic field, as known in the art. Referring again to FIG. 1, a representation of the magnetic flux density in relation to a radial distance is illustrated. For the solenoid 20 of FIG. 1, the magnetic flux density within the area encircled by the solenoid, and immediately contiguous thereto, is approximately 4 Tesla for FIG. 1, and quickly tapers off as the distance from the solenoid increases, to less than 1 Tesla for FIG. 1. Therefore, prior art solenoid structures could provide protection against particle radiation from such sources as CMEs, but the amount of material necessary for a prior art solenoid is very weight prohibitive for certain uses, such as for spacecraft.

Referring now to the radiation shield device 10 of FIG. 2, the radiation shield device comprises a magnetic field generator 30 having superconductive material 32 for providing a magnetic field 34 around an area 36 to shield the area from radiation, such as protons and heavy ions. The magnetic field generator 30 of FIGS. 2-4 is a solenoid comprising a coil of superconductive material; however, further embodiments of the present invention comprise magnetic field generators defining alternative configurations of the superconductive material. The magnetic field generator 30 illustrated in FIG. 2, provides a magnetic field 34 of approximately 2 Tesla, near the coil of superconductive material 32 and of approximately 0.5 Tesla, within and beyond the coil of superconductive material, to give non-limiting examples of magnetic flux densities. Therefore, the magnetic field generator of FIG. 2 provides a magnetic field 34 having a flux density of approximately 2 Tesla. The magnetic field generator of the present invention preferably provides magnetic fields having a magnetic flux density of 0.5 to 10 Tesla, more preferably between 1 and 8 Tesla, and most preferably between 2 and 5 Tesla. The amount of magnetic flux density provided by the magnetic field generator is predetermined based upon the energy of the particles that the radiation shield device is intended to shield against, as described more fully below.

Referring again to FIGS. 2-4, the magnetic field generator 30 defines a solenoid having an axial length that is substantially smaller than a diameter of the solenoid. For the illustrated embodiment of FIGS. 2-4, the solenoid defines a diameter of approximately 4 meters and an axial length, in the direction of the y-axis, of less than 1 meter, to list one non-limiting example. Solenoids having an axial length that is substantially smaller than the diameter, specifically less than 25% of the diameter, is preferred for reasons of form factor and manufacturability. Further embodiments of the present invention include solenoids having alternative relationships between the axial length and diameter. Still further embodiments of the present invention include magnetic field generators that define shapes other than circular, such as multi-dimensional shapes such as spherical or two-dimensional shapes such as ellipses or polygons, to list non-limiting examples, that provide sufficient radiation protection for the area around which the magnetic field generator is disposed. Specifically, the magnetic field generator is considered to be around the area if it encircles a part or all of the area in one or more dimensions. Therefore, if the area to be shielded is generally rectangular in cross-section, to define one non-limiting example, the solenoid comprises a generally rectangular shape around the area and is preferably embedded within the structure defining the area to minimize the volumetric space occupied by the magnetic field generator. FIG. 6 provides an illustration of one embodiment of the present invention that is circular and included along the outer surface of the spacecraft, as described more fully below.

The deflection of particle radiation is partially represented in FIGS. 3 and 4. FIG. 3 shows the approach of multiple particles 38 from various points along the x-axis, y-axis, and z-axis and the various angles of deflection caused by the magnetic field that is represented in FIG. 2. A side view of FIG. 3 is provided in FIG. 4, which shows the various trajectories of some of the particles 38 approaching from the left side (from the perspective of the approaching particle). The area 36 shielded from the particle radiation is also illustrated in FIG. 4. For the embodiment of FIGS. 2-4, the area protected from particle radiation generally defines the same diameter as the magnetic field generator and generally defines an axial length that is approximately half the diameter of the magnetic field generator, such as 2 meters for the illustrated embodiment. The relative dimensions of the axial length and diameter of the protected area is in part based upon the magnetic flux density of the magnetic field generated by the radiation shield device because of the relatively larger and more extended magnetic flux densities provide areas of protection with relatively greater axial length.

The particles 38 illustrated in FIGS. 3 and 4 represent proton radiation from the sun during a CME, wherein the protons define an energy of approximately 20 MeV. The radiation shield device 10 of the present invention preferably shields the area 36 from radiation particles defining an energy up to 100 MeV, and more preferably up to 150 MeV. Therefore, the radiation shield device of the present invention protects the area 36 from substantially all direct particle radiation, while also precluding indirect radiation (gamma rays, X-rays, or the like) that would be created if the particle radiation were absorbed.

The magnetic field generator 30 of the present invention comprises superconductive material 32 to enable the generator to generate a magnetic field 34 of a preferred magnetic flux density while requiring relatively little electrical energy. The superconductive material 32 of the illustrated magnetic field generators 30 comprises a coil Niobium-Titanium (NbTi) embedded in a copper wire/sheath, as known in the superconductive art. Further embodiments of the present invention include alternative superconductive materials, provide alternative ratios of superconductive material-to-sheathing, and comprise materials for doping the superconductive material to improve performance to operate at high magnetic fields. To have superconductive properties, the material 32 must be at a temperature below its critical superconducting temperature onset level and as close to absolute zero as possible, preferably 40° K or lower, more preferably less than 25° K, and most preferably less than 10° K. The radiation shield device 10 of the illustrated embodiments preferably comprises a thermal control system in thermal communication with the superconductive material to lower the temperature of the superconductive material to a desired temperature. The thermal control system of the illustrated embodiments is preferably an open loop system that includes a predetermined amount of coolant that is stored apart from the superconductive material until immediately prior to operation of the radiation shield device. To lower the temperature of the superconductive material, the coolant is placed in direct or indirect thermal communication, through conduits or the like, so that the coolant draws heat out of the superconductive material, as known in the art. Specifically, the radiation shield device of the present invention includes liquid helium or liquid neon as the coolant which absorbs thermal energy from the superconductive material as the liquid helium or liquid neon converts from a liquid to a gas (that is subsequently vented), as known in the art. Liquid neon typically cools the superconductive material to 20° K to 25° K, while liquid helium cools the superconductive material to 5° K to 10° K; therefore, a thermal control system comprising liquid helium is preferred because the lower temperatures attained with liquid helium will enable the magnetic field generator to provide a magnetic field with a given magnetic flux density using relatively less superconductive material. Because the radiation shield device of the illustrated embodiment is specifically designed to protect an area of a spacecraft, such as a crew compartment, from CME radiation, which may span a period of a day or two, the thermal control system includes a sufficient amount of coolant to maintain the desired temperature of the superconductive material for a desired period of time. An example of a sufficient amount of coolant for a CME is approximately 2 liters of liquid helium. Further embodiments of the radiation shield device include thermal control systems having alternative types and/or amounts of coolants that are specifically intended for alternative environments, purposes, and/or durations.

Further embodiments of the present invention include a thermal control system that comprises a closed loop system defining a refrigeration cycle. Such a system may be preferred in applications where energy consumption is relatively less critical. The refrigeration cycle of the thermal control system comprises one or more compressors, condensers, heat fins, and the like, as known in the art, that are in thermal communication with the superconductive material to lower the temperature of the superconductive material to a predetermined level. Therefore, a refrigeration cycle will be capable of providing indefinite cooling of the magnetic field generator, presuming the energy to run the refrigeration cycle is available. Still further embodiments of the present invention comprise alternative thermal control systems for controlling the temperature of the superconductive material.

The superconductive material is preferably maintained at a temperature as close as possible to absolute zero to maximize the magnetic flux density of the magnetic field generated by a given electrical current passing through the superconductive material. To generate the magnetic field, the radiation shield device of the present invention lowers the temperature of the superconductive material to a predetermined level and then sends an electrical current of a given amount through the superconductive material. The current will continue through the superconductive material for an extended period of time, as known in the art, based upon various parameters of the superconductive material. Preferably, an electrical current of at least 1,000 Amps is provided to the superconductive material that includes at least 1,000 turns of active flux generation, such that the coil of superconductive material comprises at least 1,000,000 Ampere-turns and more preferably comprises at least 2,000,000 Ampere-turns. Further embodiments of the present invention comprise alternative amounts of electrical current and/or turns of active flux generation to provide a magnetic field having a sufficient magnetic flux density to shield the area encircled by the magnetic field generator.

A second embodiment of the radiation shield device 110 is shown in FIG. 5, wherein the radiation shield device comprises a magnetic shield device 112 to substantially shield the area 136 from the magnetic field. Extended exposure to magnetic fields is arguably harmful to humans, electronic components, and/or other objects, and because the magnetic field generator does produce a magnetic field within the area 36 for the embodiment of FIGS. 2-4 which does not include a magnetic shield device, a magnetic shield device 112 may be provided to substantially shield the area 136 of FIG. 5 from the magnetic field 134. As shown in the graph of FIG. 5, the magnetic shield device 112, when of sufficient thickness and magnetic properties is disposed between the magnetic field generator 130 and the area 136 to be shielded from radiation, such as the crew compartment of a spacecraft, substantially reduces the magnetic flux density of the magnetic field 134 while providing a magnetic flux density of approximately 1.35 along the outer perimeter of the magnetic field generator, to provide non-limiting examples of magnetic flux densities. The paths of magnetic flux lines are illustrated in FIG. 5 and shown to travel through the magnetic shield device rather than through the area 136.

The magnetic shield device 112 of the radiation shield device 110 of FIG. 5 comprises a layer of high magnetic permeability/saturation material that preferably comprises a single layer having at least two of the following materials: nickel, iron, copper, molybdenum, and chromium. One non-limiting example of a high magnetic permeability/saturation material is the magnetic shield device 112 of FIG. 5, which comprises a single layer of Mumetal® (also known as Hipernom®, HyMu-80®, and Permalloy) which is available from Goodfellow Corp. of Devon, Pa., among other sources. Another choice for magnetic shielding material would be common purified iron, at 99.9% purity, which exhibits a relative magnetic permeability of 350,000 and supports saturation fluxes of 2.16 Tesla. The layer of the magnetic shield device 112 preferably defines a cross-sectional pattern that is substantially equivalent to, though slightly smaller than, the cross-sectional pattern of the magnetic field generator 130. The magnetic shield device 112 also defines an axial length that is longer than the axial length of the magnetic field generator and preferably defines an axial length that is substantially equivalent to the axial length of the area 136 protected from radiation so that a substantially equivalent volume of area is also shielded from the magnetic field 134. The layer of high magnetic permeability/saturation material of FIG. 5 preferably defines a radial thickness of 5 to 10 mm; however, further embodiments of the radiation shield device include magnetic shield devices having alternative thicknesses, alternative numbers of layers, and alternative axial lengths and cross-sectional patterns to shield the area.

The radiation detection device and methods comprise an antenna to communicate directly, or via the earth, with one or more satellites that are approximately located between the sun and the spacecraft and that include radiation detection sensors for detecting radiation that contacts the satellite to provide warning signals to the spacecraft of approaching radiation. Still further embodiments of the present invention include radiation detection devices and methods comprising onboard sensors and processing circuitry for detecting the approach of radiation. Preferably, adequate time is provided to cool the superconductive material, as described above, and start the magnetic field generator, as described above, to provide radiation protection once the radiation arrives. Still further embodiments of the invention comprise alternative radiation detection devices and methods for determining the approach of radiation, either for space exploration applications or other uses.

A spacecraft 200 that includes a radiation shield device 210 of the present invention is illustrated in FIGS. 6 and 7. The spacecraft 200 defines a cylindrical shape having a total axial length of approximately 2 meters and a diameter of approximately 4 meters. The spacecraft 200 is also capped with a hemispherical nose that might not be protected in some embodiments of the present invention. The interior of the spacecraft 200 comprises the area 236 which is protected from radiation by the radiation shield device 210, and may house one or more crew members, such as the two members illustrated in FIG. 6, or may house no crew members. The spacecraft 200 preferably comprises one or more modules of the crew exploration vehicle (CEV) currently being developed for space exploration. The CEV is a multi-element vehicle configuration, which may include both manned and unmanned elements, any of which may be protected by the radiation shield device 210 of the present invention. For example, the spacecraft 200 of FIG. 6 is a crew compartment for the CEV in some embodiments of the present invention, such that the crew compartment is protected from radiation by the radiation shield device 210.

The radiation shield device 210 includes the magnetic field generator 230, which is preferably a solenoid of superconductive material 232, encircling the area 236 at approximately the axial center of the spacecraft. The magnetic field generator 230 may define any radial thickness, and the radial thickness is advantageously minimized at least for reasons of form factor. The radiation shield device 210 also includes a magnetic shield device 212 along the cylindrical portion of the spacecraft 200. The magnetic shield device 212 may define any surface of the spacecraft structure, such as the outer surface as illustrated in FIG. 6.

The radiation shield device 210 of FIG. 6 also includes a thermal control system 250 that may be either an open loop or closed loop system, as described above. If the thermal control system 250 is an open loop system, the coolant lines 252 transfer stored liquid neon or liquid helium to the superconductive material 232 to cool the material. Similarly if the thermal control system 250 is a closed loop system, the coolant lines 252 transfer the refrigerant to and from the compressor and condenser, or other refrigeration components, of the thermal control system. The radiation shield device 210 also includes a radiation detection device and method that comprises an antenna 254 that enables communication with earth-based and/or celestial-based support. The antenna 254 of FIG. 6 is a planar antenna; however, further embodiments of the radiation shield device comprise antennas of alternative configuration, such as parabolic/hyperbolic antennas, horn antennas, or the like.

Information received through the antenna 254 is transferred to the terminal 256 which preferably includes a display for a crew member to view the data. The terminal 256 includes a radio transceiver and processing circuitry to determine if radiation is approaching and includes components, such as thrusters or the like, to orient the spacecraft 200 to a desired orientation relative to the sun in the event of a CME.

The present invention also provides methods for manufacturing a radiation shield device that provides radiation protection to an area. The manufacturing method of the embodiments of the invention relating to spacecraft assembly advantageously include assembly techniques and component configurations that minimize the weight and volume of the radiation shield device, particularly in applications where weight and size are important parameters. FIG. 8 is a flow chart illustrating steps 300 through 306 for manufacturing a radiation shield device by one method of the present invention. Step 300 comprises installing a magnetic field generator, such as a solenoid, of superconductive material around the area to be shielded from radiation. Step 302 comprises providing a thermal control system in thermal communication with the superconductive material. Furthermore, step 304 comprises positioning a magnetic shield device between the magnetic field generator and the area to be shielded from radiation. Finally, step 306 comprises providing a radiation detection device. Further embodiments of the present invention may comprise additional steps, fewer steps, and/or alternative steps to manufacture radiation shield devices of the present invention.

Referring now to the embodiments of the present invention illustrated in FIGS. 9-18, the radiation shield device provides substantially isotropic protection by defining magnetic field generators of various shapes. The shape of the magnetic field generators illustrated in FIGS. 2-6 are generally cylindrical, whereas in the embodiments of FIGS. 9-18, a magnetic field generator having at least one trapezoidal portion provides substantially isotropic radiation protection. The term "trapezoidal portion" is used herein to describe a portion of a magnetic field generator wherein the radial distance of the solenoid coil or other magnetic field generator from a centerline or axis of the coil or magnetic field generator to the trapezoidal portion decreases as the coil or magnetic field generator extends in an axial direction, preferably in an axial direction away from the center of the area being protected, such that a side view of the spiral trapezoidal portion generally defines a trapezoid to describe one non-limiting example. Alternative trapezoidal portions of the present invention may include curved portions, when viewed from a side, or may include portions that increase and decrease along various axial positions, to describe further non-limiting examples. The trapezoidal portions of the present invention provide a magnetic field that proximate the trapezoidal portions extends in a relatively more radial direction than the magnetic field provided by a cylindrical portion alone, thus providing isotropic protection from radiation. By including a radiation shield device that provides substantially isotropic protection from radiation from CMEs or other sources, the radiation shield device does not require or prefer a predetermined orientation relative to the approaching radiation.

The radiation shield device 310 of FIGS. 9 and 10 is illustrated on an outer portion of a spacecraft to provide substantially isotropic protection to an area 336 within the spacecraft. The radiation shield device 310 comprises at least one magnetic field generator 330, such as the four magnetic field generators of FIG. 9, mounted on an outer portion of the spacecraft and having superconductive material for providing a magnetic field 334, as shown in FIG. 10, around the area 336 to shield the area from radiation. The magnetic field generator of FIGS. 9 and 10 comprises four trapezoidal portions 330a-330d along the axial length of the spacecraft. The north N and south S poles of each magnetic field generator 330 are illustrated; however, it should be appreciated that the poles of the individual magnetic field generators can be reversed while providing generally equivalent protection from radiation. The magnetic field generators 330 are preferably solenoids of superconductive material as described for the embodiments above. The radiation shield device 310 of FIGS. 9 and 10 also includes a magnetic shield device 312 of a high magnetic permeability/saturation material, as described for the embodiments above.

As shown in FIG. 10, the trapezoidal portions 330a-330d of the magnetic field generator provide magnetic flux lines 334 that proximate the axial distal ends of the spacecraft extend in a substantially radial direction to thereby provide protection from radiation approaching in a substantially axial direction. Accordingly, the magnetic field generator 330 provides substantially isotropic radiation protection to the area 336, while the magnetic shield device 312 substantially shields the area from the magnetic field 334 generated by the magnetic field generator. Therefore, the spacecraft will not necessarily need to be positioned in a predetermined orientation to provide protection from approaching radiation.

Referring now to FIGS. 11 and 12, the radiation shield device 410 is illustrated on an outer portion of a ground habitat to provide substantially isotropic protection to an area 436 within the ground habitat. The radiation shield device 410 comprises at least one magnetic field generator 430 mounted on an outer portion of the ground habitat, such as one trapezoidal portion 430a proximate the roof of the ground habitat and one generally cylindrical portion 430b proximate the walls of the ground habitat. The surface ground provides radiation protection to the lower hemisphere of the ground habitat. The magnetic field generators of FIG. 11 include Niobium-Titanium as the superconductive material. The radiation shield device 410 of FIGS. 11 and 12 also includes a magnetic shield device 412 of a high magnetic permeability/saturation material, as described for the embodiments above.

As shown in FIG. 12, the trapezoidal portion 430a of the magnetic field generator provides magnetic flux lines 434 that proximate the roof of the ground habitat, which may define a roof line of any angle or shape, extend in a substantially radial direction to thereby provide protection from radiation approaching in a substantially axial direction. Accordingly, the magnetic field generator 430 provides substantially isotropic radiation protection to the area 436, while the magnetic shield device 412 substantially shields the area from the magnetic field 434 generated by the magnetic field generator. Therefore, the ground habitat will be protected from radiation approaching from any direction. Therefore, the need to provide adequately thick layers of passive absorption material or the need to haul mining equipment to gather regolith material for constructing shielding would be eliminated by the radiation shield device 410. The radiation shield device 410 of FIG. 11 would also allow a crew to be protected without requiring the crew be confined to a relatively smaller area for periods up to several days or a week during a CME event.

Referring now to FIGS. 13 and 14, the radiation shield device 510 is illustrated on an outer portion of a personal protection suit to provide substantially isotropic protection to an area 536 within the personal protection suit. The radiation shield device 510 comprises at least one magnetic field generator 530, such as one trapezoidal portion 530a proximate the shoulders of the personal protection suit and one generally cylindrical portion 530b proximate the waist of the personal protection suit. The surface ground provides radiation protection to the lower hemisphere of the personal protection suit. The magnetic field generators of FIG. 13, include Niobium-Titanium as the superconductive material. The personal protection suit of the present invention provides radiation protection away from a vehicle or habitat. Without such protection, individuals would be required to stay within a few minutes from a protected vehicle or habitat in order to be protected from radiation from CMEs or other sources. Whereas the weight of the radiation shield device is important in substantially all embodiments of the present invention, the weight of the radiation shield device is particularly important with regards to the personal protection suit because a radiation shield device having a prohibitive amount of weight would not be practical. For the embodiment illustrated in FIGS. 13 and 14, the trapezoidal portion 530a and the generally cylindrical portion 530b each provide 1,000,000 ampere-turns to produce 2-5 Teslas of repelling magnetic shielding proximate the magnetic field generator. The waist coil, or generally cylindrical portion 530b, of Niobium-Titanium capable of 3,000 amperes provided in 300 turns would be 0.5 meters in diameter, thus requiring 0.45 kilometers of wire weighing 24 pounds per kilometers, thus weighing 11 pounds. Similarly, the shoulder coil, or trapezoidal portion 530a, of Niobium-Titanium capable of 3,000 amperes provided in 300 turns would have an average diameter of 0.42 meters, thus requiring 9 pounds of material, totaling approximately 20 pounds for the two coils. The thermal control system 550 would weigh an additional 1 to 2 pounds. The entire radiation shield device 510 would weigh about 22 pounds, which in many applications of the personal protection suit would be a reasonable amount of additional weight, especially in space settings with lower gravitational forces.

As shown in FIG. 14, the trapezoidal portion 530a of the magnetic field generator provides magnetic flux lines 534 that proximate the upper hemisphere of the personal protection suit extend in a substantially radial direction to thereby provide protection from radiation approaching in a substantially axial direction. Accordingly, the magnetic field generator 530 provides substantially isotropic radiation protection to the area 536, while the magnetic shield device 512 substantially shields the individual from the magnetic field 534 generated by the magnetic field generator. Therefore, the personal protection suit will be protected from radiation approaching from any direction.

Referring now to FIGS. 15 and 16, the radiation shield device 610 is illustrated on an outer portion of a satellite to provide substantially isotropic protection to an area 636 within the satellite. The radiation shield device 610 comprises at least one magnetic field generator 630, such as one trapezoidal portion 630a and 630d proximate each axial endcap of the satellite and two generally cylindrical portion 630b and 630c proximate the side walls of the satellite. The magnetic field generators of FIG. 15, include Niobium-Titanium as the superconductive material. The radiation shield device 610 of FIGS. 15 and 16 also includes a magnetic shield device 612 of a high magnetic permeability/saturation material, as described for the embodiments above. The magnetic field generator provides 3,000,000 ampere turns for each of the trapezoidal portions 630a and 630d and 2,000,000 ampere turns for each of the generally cylindrical portions 630b and 630c for a total 10,000,000 ampere turns for the magnetic field generator, to describe one non-limiting example of a magnetic field generator. The magnetic field generator 630 provides approximately 100% protection from 150 MeV protons approaching at various directions; however, further embodiments of the present invention may protect against less than 100% of radiation while providing substantially isotropic protection against impinging radiation.

As shown in FIG. 16, the trapezoidal portions 630a and 630d of the magnetic field generator provide magnetic flux lines 634 that extend in a substantially radial direction proximate the axial endcaps to thereby provide protection from radiation approaching in a substantially axial direction. Accordingly, the magnetic field generator 630 provides substantially isotropic radiation protection to the area 636, while the magnetic shield device 612 substantially shields the area from the magnetic field 634 generated by the magnetic field generator. Therefore, the satellite will be substantially isotropically protected from radiation.

Referring now to FIGS. 17 and 18, the radiation shield device 710 is illustrated on an outer portion of a satellite, similar to the embodiment of FIGS. 15 and 16, but wherein the radiation shield device includes a spike 700 extending from each of the axial endcaps to change the shape of the magnetic field 734 and thereby provide additional protection from radiation relative to embodiments that do not include a spike. The spike 700 preferably comprises a high permeability/saturation material, such as Mumetal® or 99.9% pure iron and preferably defines a cylindrical rod that is approximately 2 centimeters in diameter and 80 centimeters long; however, further embodiments of the present invention may comprise one or more spikes of any material, shape, or size. The spike may be any protrusion from the magnetic shield device 712 extending in a direction away from the protected area 736, or the spike may be any protrusion that begins proximate the perimeter of the area 836 protected from radiation and that extends away from the center of the area. Preferably, the spike is axially aligned with the central axis of one or more magnetic field generators 730, as illustrated in FIGS. 18 and 19; however spikes of further embodiments of the present invention may extend away from the center of the protected area in any direction relative to the magnetic field generators. As shown in FIGS. 18 and 19, the spikes 700 and 800 cause the magnetic flux lines 734 and 834 proximate the spikes to extend in a substantially radial direction to thereby provide protection from radiation approaching in a substantially axial direction. FIGS. 20A, 20B, and 20C are provided to illustrate the flux densities proximate the top spike in an axial direction, proximate the axial center in a radial direction, and proximate the bottom spike in an axial direction, respectively. FIGS. 21A-21H are provided to illustrate how a satellite with a magnetic field generator and a spike of the present invention is able to deflect substantially all approaching ion particle radiation at various angles of approach, thus demonstrating the substantially isotropic protection afforded by the radiation shield device of the present invention.

FIG. 19 illustrates one embodiment of the invention in which a spike 800 of high permeability/saturation metal is provided at each axial end of the area 836 protected from radiation but no magnetic shield device is provided. As shown in FIG. 19, not only does the magnetic field enter the area 836 protected from radiation, but the magnetic flux lines 834 proximate the spikes 800 are relatively less radially oriented when compared with comparable magnetic flux lines 734 of the embodiment of FIG. 18 having a magnetic shield device 712. However, the embodiment of FIG. 19 does provide substantially isotropic protection from approaching radiation from CMEs or other sources. The spikes may be used with each illustrated embodiment of the present invention and all further embodiments of the present invention to improve the radiation protection afforded by the respective radiation shield device.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A radiation shield device for providing substantially isotropic radiation protection to an area, the radiation shield device comprising:

a magnetic field generator comprising superconductive material for providing a magnetic field around the area to shield the area from radiation, wherein the magnetic field generator further comprises at least one trapezoidal portion;

a passive magnetic shield device comprising a layer of high magnetic permeability/saturation material disposed between the magnetic field generator and the area;

a spike extending from the magnetic shield device in a direction away from an interior of the area and configured to at least partially shape the magnetic field; and a thermal control system for controlling a temperature of the superconductive material.

2. A radiation shield device according to claim 1 wherein the magnetic field generator comprises a solenoid.

3. A radiation shield device according to claim 1 wherein the magnetic field generator provides a magnetic field having a magnetic flux density of 0.5 to 10 Tesla.

4. A radiation shield device according to claim 1 wherein the superconductive material of the magnetic field generator comprises a coil of Niobium-Titanium embedded in a copper wire.

5. A radiation shield device according to claim 1 wherein the magnetic field generator defines a central axis, and wherein the spike is axially aligned with the central axis of the magnetic field generator.

6. A radiation shield device according to claim 1 wherein the spike is spaced from each magnetic field generator.

7. A radiation shield device for providing substantially isotropic radiation protection to an area, the radiation shield device comprising:

a magnetic field generator comprising superconductive material for providing substantially isotropic radiation protection around the area to shield the area from radiation;

a spike spaced apart from each magnetic field generator, extending from the area in a direction away from an interior of the area and configured to at least partially shape a magnetic field created by the magnetic field generator; and a thermal control system for controlling a temperature of the superconductive material.

8. A radiation shield device according to claim 7 wherein the magnetic field generator comprises at least one trapezoidal portion.

9. A radiation shield device according to claim 7 wherein the magnetic field generator provides a magnetic field having a magnetic flux density of 0.5 to 10 Tesla.

10. A radiation shield device according to claim 9 wherein the magnetic superconductive material of the field generator comprises a coil of Niobium-Titanium embedded in a copper wire.

11. A radiation shield device according to claim 7 wherein the magnetic field generator is mounted on an outer portion of a satellite to substantially isotropically protect an area of the satellite from radiation.

12. A radiation shield device according to claim 7, further comprising a magnetic shield device for substantially shielding the area from the magnetic field generated by the solenoid of superconductive material.

13. A radiation shield device according to claim 12 wherein the magnetic shield device comprises a passive magnetic shield device comprising a layer of high magnetic permeability/saturation material disposed between the magnetic field generator and the area, and wherein the spike extends from the magnetic shield device.

14. A radiation shield device according to claim 7 wherein the magnetic field generator defines a central axis, and wherein the spike is axially aligned with the central axis of the magnetic field generator.

15. A method of manufacturing a radiation shield device that provides isotropic radiation protection to an area, the method comprising the steps of:
    installing a solenoid of superconductive material around the area to be shielded from radiation, wherein at least one solenoid of superconductive material comprises at least one trapezoidal portion, and wherein the solenoid defines a central axis;
    providing a spike that is axially aligned with the central axis defined by the solenoid, that extends from the area in a direction away from an interior of the area and that is configured to at least partially shape a magnetic field created by the solenoid; and
    providing a thermal control system in thermal communication with the superconductive material.

16. A method according to claim 15, further comprising the step of positioning a magnetic shield device between the solenoid of superconductive material and the area to be shielded from radiation.

17. A method according to claim 16 wherein positioning the magnetic shield device comprises positioning a passive magnetic shield device comprising a layer of high magnetic permeability/saturation material between the solenoid and the area such that the spike extends from the magnetic shield device.

18. A method according to claim 15, further comprising the step of providing a radiation detection device and method that determines the approach of radiation.

19. A method according to claim 15 wherein installing a solenoid of superconductive material comprises mounting a solenoid of superconductive material on an outer portion of the group consisting of: a spacecraft, a personal protection suit, a ground habitat, or a satellite.

20. A method according to claim 15 wherein providing the spike comprises positioning the spike to be spaced apart from each solenoid.

21. A radiation shield device for providing substantially isotropic radiation protection to an area, the radiation shield device comprising:
    a magnetic field generator for providing a magnetic field around the area to shield the area from radiation, said magnetic field generator defining a central axis; and
    at least one spike of high magnetic permeability/saturation material extending from proximate a perimeter of the area in a direction away from a center of the area, said spike axially aligned with the central axis defined by the magnetic field generator.

22. A radiation shield device according to claim 21 wherein the magnetic field generator further comprises at least one trapezoidal portion.

23. A radiation shield device according to claim 21 wherein the magnetic field generator comprises a solenoid.

24. A radiation shield device according to claim 21 wherein the magnetic field generator provides a magnetic field having a magnetic flux density of 0.5 to 10 Tesla.

25. A radiation shield device according to claim 21 wherein the superconductive material of the magnetic field generator comprises a coil of Niobium-Titanium embedded in a copper wire.

26. A radiation shield device according to claim 21 wherein the magnetic field generator is mounted on an outer portion of a satellite to substantially isotropically protect an area of the satellite from radiation.

27. A radiation shield device according to claim 21, further comprising a magnetic shield device for substantially shielding the area from the magnetic field generated by the magnetic field generator, wherein the magnetic shield device comprises a layer of high magnetic permeability/saturation material disposed between the magnetic field generator and the area to be shielded from radiation.

28. A radiation shield device according to claim 27 wherein the spike extends from the magnetic shield device.

29. A radiation shield device according to claim 21 wherein the spike of high magnetic permeability/saturation material comprises an element or alloy containing at least one of the following materials: nickel, iron, copper, molybdenum, and chromium.

30. A radiation shield device according to claim 21 wherein the spike is spaced from each magnetic field generator.

* * * * *